United States Patent
Ohnuma et al.

(10) Patent No.: US 7,784,078 B2
(45) Date of Patent: Aug. 24, 2010

(54) INFORMATION PROCESSING SYSTEM, INFORMATION PROCESSING DEVICE AND METHOD, RECORDING MEDIUM, AND PROGRAM

(75) Inventors: Kensuke Ohnuma, Tokyo (JP); Hitoshi Kimura, Kanagawa (JP); Ayako Nakayama, Kanagawa (JP); Hidetoshi Ichioka, Tokyo (JP); Shinichi Wakai, Tokyo (JP)

(73) Assignee: Sony Corporation (JP)

( * ) Notice: Subject to any disclaimer, the term of this patent is extended or adjusted under 35 U.S.C. 154(b) by 1003 days.

(21) Appl. No.: 10/491,308

(22) PCT Filed: Jul. 30, 2003

(86) PCT No.: PCT/JP03/09630

§ 371 (c)(1),
(2), (4) Date: Sep. 24, 2004

(87) PCT Pub. No.: WO2004/012448

PCT Pub. Date: Feb. 5, 2004

(65) Prior Publication Data

US 2005/0022251 A1    Jan. 27, 2005

(30) Foreign Application Priority Data

Jul. 30, 2002    (JP)    ............................. 2002-221128

(51) Int. Cl.
*H04N 7/173*    (2006.01)
(52) U.S. Cl. .............................. 725/91; 725/87; 725/89; 725/92
(58) Field of Classification Search .................. 725/87, 725/89, 91–92
See application file for complete search history.

(56) References Cited

U.S. PATENT DOCUMENTS 5,521,631 A * 5/1996 Budow et al. ................. 725/78
5,721,815 A * 2/1998 Ottesen et al. .............. 715/721

(Continued)

FOREIGN PATENT DOCUMENTS

JP    8-56352 A1    2/1996

(Continued)

*Primary Examiner*—Christopher Kelley
*Assistant Examiner*—Charles N Hicks
(74) *Attorney, Agent, or Firm*—Lerner, David, Littenberg, Krumholz & Mentlik, LLP

(57) ABSTRACT

The present invention relates to an information processing system, information processing apparatus and method, recording medium and program, adapted to exchange picture-recording schedule information between the terminals. A user apparatus 3-2 registers generated picture-recording schedule information to a server 2-1 through a network 1, together with the information representative of a providing destination. The server 2-1, when registering the picture-recording schedule information, makes a notification to a user apparatus 3-1 as a providing destination thereof. The video recording/reproducing apparatus 11 of the user apparatus 3-1 accesses the server 2-1 through the network 1, and designates a picture-recording schedule program desired for scheduling of picture-recording of among the programs registered in the picture-recording schedule information. The server 2-1 sends the schedule information on a designated program to the video recording/reproducing apparatus 11 through the network 1. The video recording/reproducing apparatus 11 receives this and makes a scheduling of picture-recording on the basis of the picture-recording schedule information. The invention is applicable to the hard-disk video recorder.

18 Claims, 21 Drawing Sheets

U.S. PATENT DOCUMENTS

| | | | |
|---|---|---|---|
| 6,697,792 B2 * | 2/2004 | Bunney et al. | 707/1 |
| 2003/0005453 A1 * | 1/2003 | Rodriguez et al. | 725/87 |
| 2003/0200548 A1 * | 10/2003 | Baran et al. | 725/90 |
| 2005/0097619 A1 * | 5/2005 | Haddad | 725/115 |

FOREIGN PATENT DOCUMENTS

| | | |
|---|---|---|
| JP | 10-155131 A1 | 6/1998 |
| JP | 2001-136452 A1 | 5/2001 |
| JP | 2001-285766 A1 | 10/2001 |
| JP | 2001-339674 A1 | 12/2001 |

* cited by examiner

FIG. 7

| DATE | START TIME | END TIME | CHANNEL | MODE | EXTENSION | PROTECT |
|---|---|---|---|---|---|---|
| 2/16 (FRIDAY) | 5:00 PM | 6:52 PM | 1 | SP | NO | YES |

FIG. 8

| BROADCAST PROGRAM INFORMATION ||
|---|---|
| BROADCAST STATION | TV JAPAN |
| BROADCAST DATE | 2002/3/26 |
| START TIME | 17:00 |
| END TIME | 18:00 |
| GENRE | VARIETY |
| TITLE | NEWS17 |
| DETAILED INFORMATION | PREMIER RESIGNED, YEN'S DEPRECIATION PROCEEDING |
| : | : |
| : | : |

FIG. 22

| PICTURE-RECORDING SCHEDULE LIST | | | | |
|---|---|---|---|---|
| NO. | BROADCAST DATE | BROADCAST STATION | BROADCAST START TIME | BROADCAST END TIME |
| 1 | JULY 1, 2002 | TV Japan | 16:00:00 | 16:30:00 |
| 2 | JULY 1, 2002 | NHH | 17:30:00 | 18:30:00 |
| 3 | JULY 1, 2002 | ABC | 19:20:00 | 19:40:00 |
| 4 | JULY 1, 2002 | BBB | 21:00:00 | 21:10:00 |
| 5 | JULY 2, 2002 | TVV | 13:00:00 | 15:00:00 |
| 6 | JULY 2, 2002 | TVV | 15:00:00 | 16:30:00 |
| 7 | | | | |
| 8 | | | | |
| 9 | | | | |
| 10 | | | | |

# INFORMATION PROCESSING SYSTEM, INFORMATION PROCESSING DEVICE AND METHOD, RECORDING MEDIUM, AND PROGRAM

TECHNICAL FIELD

The present invention relates to an information processing system, information processing apparatus and method, recording medium and program, and more particularly to an information processing system, information processing apparatus and method, recording medium and program, adapted to exchange picture-recording schedule information between the terminals.

BACKGROUND ART

JP-A-2001-136452 discloses that picture-recording schedule information is to be acquired for a video appliance, e.g. a hard-disk video recorder, by way of a network.

Meanwhile, JP-A-2001-339674 discloses that scheduling of picture-recording is to be made by use of the picture-recording schedule information forwarded by an e-mail.

Furthermore, JP-A-2001-285766 or JP-A-10-155131 discloses those concerning network services for scheduling of picture-recording by using the broadcast-related information prepared on the server.

However, the inventions, described in JP-A-2001-136452, JP-A-2001-339674, JP-A-2001-285766 and JP-A-10-155131, have involved a problem that picture-recording schedule information is not allowed for exchange between the terminals.

DISCLOSURE OF THE INVENTION

The present invention, made in view of such situations, is for allowing picture-recording schedule information to be exchanged between the terminals.

An information processing system of the present invention is an information processing system configured by a first information processing apparatus, a second information processing apparatus for exchanging information with the first information processing apparatus and a third information processing apparatus for controlling to exchange information between the first information processing apparatus and the second information processing apparatus, that are connected to a network, the information processing system characterized in that: the first information processing apparatus sends a destination of provision, where the picture-recording program information is to be provided, to the third information processing apparatus through the network, together with picture-recording program information about a to-be-picture-recorded program; the third information processing apparatus registering the picture-recording program information sent from the first information processing apparatus through the network, and sending the picture-recording program information registered to the second information processing apparatus through the network in the case the second information processing apparatus is the destination of provision; the second information processing apparatus receiving the picture-recording program information stored in the third information processing apparatus by the first information processing apparatus, from the third information processing apparatus through the network.

A first information processing method of the invention is an information processing method for an information processing system configured by a first information processing apparatus, a second information processing apparatus for exchanging information with the first information processing apparatus and a third information processing apparatus for controlling to exchange information between the first information processing apparatus and the second information processing apparatus, that are connected to a network, the information processing method characterized in that: the first information processing apparatus sends a destination of provision, where the picture-recording program information is to be provided, to the third information processing apparatus through the network, together with picture-recording program information about a to-be-picture-recorded program; the third information processing apparatus registering the picture-recording program information sent from the first information processing apparatus through the network, and sending the picture-recording program information registered to the second information processing apparatus through the network in the case the second information processing apparatus is the destination of provision; the second information processing apparatus receiving the picture-recording program information stored in the third information processing apparatus by the first information processing apparatus, from the third information processing apparatus through the network.

A first information processing apparatus of the invention is characterized by comprising: first acquiring means for acquiring picture-recording program information about a to-be-recorded program; second acquiring means for acquiring destination-of-provision information for specifying a destination of provision where the picture-recording program information is to be provided; and providing means for providing the picture-recording program information acquired by the first acquiring means and the destination-of-provision information acquired by the second acquiring means, to another information processing apparatus.

The providing means can be configured to send and register the picture-recording program information and the destination-of-provision information to first another information processing apparatus of the other information processing apparatuses through a network, and further cause the first other information processing apparatus to provide the picture-recording program information to second another information processing apparatus of the other information processing apparatuses defined by the destination-of-provision information through the network.

A second information processing method of the present invention is characterized by including: a first acquiring step of acquiring picture-recording program information about a to-be-recorded program; a second acquiring step of acquiring destination-of-provision information for specifying a destination of provision where the picture-recording program information is to be provided; and a providing step of providing the picture-recording program information acquired by a process of the first acquiring step and the destination-of-provision information acquired by a process of the second acquiring step to another information processing apparatus.

A program recorded on a first recording medium of the invention is characterized by including: a first acquiring step of acquiring picture-recording program information about a to-be-recorded program; a second acquiring step of acquiring destination-of-provision information for specifying a destination of provision where the picture-recording program information is to be provided; and a providing step of providing the picture-recording program information acquired by a process of the first acquiring step and the destination-of-provision information acquired by a process of the second acquiring step to another information processing apparatuses.

A first program of the invention is characterized for a computer to execute: a first acquiring step of acquiring picture-recording program information about a to-be-recorded program; a second acquiring step of acquiring destination-of-provision information for specifying a destination of provision where the picture-recording program information is to be provided; and a providing step of providing the picture-recording program information acquired by a process of the first acquiring step and the destination-of-provision information acquired by a process of the second acquiring step to another information processing apparatus.

A second information processing apparatus of the invention is characterized by comprising: access means for accessing another information processing apparatus through a network; receiving means for receiving picture-recording program information about a to-be-recorded program from the accessed other information processing apparatus through the network; storing means for storing the picture-recording program information received from the other information processing apparatus; and schedule picture-recording means for picture-recording the program by scheduling, on the basis of the picture-recording program information stored in the storing means.

There can be further comprised of first acquiring means for acquiring designation information for designating a predetermined program, from the picture-recording program information received from the other information processing apparatus; and sending means for sending the designation information acquired by the first acquiring means, to the other information processing apparatus through the network; whereby the receiving means receives the picture-recording program information of the program sent from the other information processing apparatus through the network and corresponding to the designation information sent by the sending means; the storing means storing the picture-recording program information of the program sent by the sending means and corresponding to the designation information.

The receiving means can be made to receive first picture-recording program information registered in the other information processing apparatus by a user other than a user on the information processing apparatus and second picture-recording program information provided by the other information processing apparatus by itself, further including second acquiring means for acquiring selection information for selecting any one of the first picture-recording program information and the second picture-recording program information, presenting means for presenting any one of the first picture-recording program information and the second picture-recording program information on the basis of the selection information acquired by the second acquiring means, and third acquiring means for acquiring designation information for designating any one of the first picture-recording program information and second picture-recording program information presented by the presenting means, whereby the first acquiring means acquires designation information for designating a predetermined program, from the picture-recording program information corresponding to designation information acquired by the third acquiring means.

A third information processing method of the invention is characterized by including: an access step of accessing another information processing apparatus through a network; a receiving step of receiving picture-recording program information about a to-be-recorded program from the accessed other information processing apparatus through the network; a storing step of storing the picture-recording program information received from the other information processing apparatus; and a schedule picture-recording step of picture-recording the program by scheduling, on the basis of the picture-recording program information stored by a process of the storing step.

A program recorded on a second recording medium of the invention is characterized by including: an access step of accessing another information processing apparatus through a network; a receiving step of receiving picture-recording program information about a to-be-recorded program from the accessed other information processing apparatus through the network; a storing step of storing the picture-recording program information received from the other information processing apparatus; and a schedule picture-recording step of picture-recording the program by scheduling, on the basis of the picture-recording program information stored by a process of the storing step.

A second program of the invention is characterized to execute: an access step of accessing another information processing apparatus through a network; a receiving step of receiving picture-recording program information about a to-be-recorded program from the accessed other information processing apparatus through the network; a storing step of storing the picture-recording program information received from the other information processing apparatus; and a schedule picture-recording step of picture-recording the program by scheduling, on the basis of the picture-recording program information stored by a process of the storing step.

A third information processing apparatus is characterized by comprising: first accepting means the first other information processing apparatus accepts an access through the network; receiving means for receiving picture-recording program information about a to-be-recorded program and destination-of-provision information for specifying a destination of provision where the picture-recording program information is to be provided, sent from the first other information processing apparatus whose access has been accepted by the first receiving means; registering means for registering the picture-recording program information and destination-of-provision information received by the receiving means; second receiving means for receiving an access through the network by the second other information processing apparatus; determining means for determining whether or not the second other information processing apparatus whose access has been accepted by the second accepting means is the destination of provision where the picture-recording program information is to be provided; and first sending means for sending the picture-recording program information registered in the registering means to the second information processing apparatus through the network in a case determined by the determining means that the second other information processing apparatus whose access has been accepted by the second accepting means is the destination of provision where the picture-recording program information is to be provided.

There can be further comprised of first acquiring means for acquiring designation information for designating the program selected based on the picture-recording program information sent by the first sending means from the second other information processing apparatus through the network, and second sending means for sending the picture-recording program information of the program corresponding to the designation information acquired by the first acquiring means to the second information processing apparatus through the network.

The first sending means can be configured to send, to the second other information processing apparatus, first picture-recording program information registered by the first other information processing apparatus and selection information for selecting second picture-recording program information provided by the information processing apparatus by itself, the acquiring means acquiring the designation information for designating the program as a selected one based on the picture-recording program information selected by the first other information processing apparatus of any one of the first picture-recording program information and second picture-recording program information sent by the first sending means.

A fourth information processing method of the invention is characterized by comprising: a first accepting step of accepting an access through the network by the first other information processing apparatus; a receiving step of receiving picture-recording program information about a to-be-recorded program and destination-of-provision information for specifying a destination of provision where the picture-recording program information is to be provided, sent from the first other information processing apparatus whose access has been accepted by a process of the first accepting step; a registering step of registering the picture-recording program information and destination-of-provision information received by a process of the receiving step; a second accepting step for accepting an access through the network by the second other information processing apparatus; a determining step of determining whether or not the second other information processing apparatus whose access has been accepted by a process of the second accepting step is the destination of provision where the picture-recording program information is to be provided; and a sending step of sending the picture-recording program information registered by a process of the registering step to the second information processing apparatus through the network in a case determined by a process of the determining step that the second other information processing apparatus whose access has been accepted by a process of the second accepting step is the destination of provision where the picture-recording program information is to be provided.

A program recorded on a third recording medium of the invention is characterized by including: a first accepting step of accepting an access through the network by the first other information processing apparatus; a receiving step of receiving picture-recording program information about a to-be-recorded program and destination-of-provision information for specifying a destination of provision where the picture-recording program information is to be provided, sent from the first other information processing apparatus whose access has been accepted by a process of the first accepting step; a registering step of registering the picture-recording program information and destination-of-provision information received by a process of the receiving step; a second accepting step for accepting an access through the network by the second other information processing apparatus; a determining step of determining whether or not the second other information processing apparatus whose access has been accepted by a process of the second accepting step is the destination of provision where the picture-recording program information is to be provided; and a sending step of sending the picture-recording program information registered by a process of the registering step to the second information processing apparatus through the network in a case determined by a process of the determining step that the second other information processing apparatus whose access has been accepted by a process of the second accepting step is the destination of provision where the picture-recording program information is to be provided.

A third program of the invention is characterized for a computer to execute: a first accepting step of accepting an access through the network by the first other information processing apparatus; a receiving step of receiving picture-recording program information about a to-be-recorded program and destination-of-provision information for specifying a destination of provision where the picture-recording program information is to be provided, sent from the first other information processing apparatus whose access has been accepted by a process of the first receiving step; a registering step of registering the picture-recording program information and destination-of-provision information received by a process of the receiving step; a second accepting step for accepting an access through the network by the second other information processing apparatus; a determining step of determining whether or not the other second information processing apparatus whose access has been accepted by a process of the second accepting step is the destination of provision where the picture-recording program information is to be provided; and a sending step of sending the picture-recording program information registered by a process of the registering step to the second information processing apparatus through the network in a case determined by a process of the determining step that the second other information processing apparatus whose access has been accepted by a process of the second accepting step is the destination of provision where the picture-recording program information is to be provided.

In the first invention, by the first information processing apparatus, a destination of provision where picture-recording program information is to be provided is sent, together with picture-recording information about the to-be-recorded program, to the third information processing apparatus through the network and registered therein. In the case that the second information processing apparatus is the destination of provision, the picture-recorded program information registered in the third information processing apparatus is sent to the second information processing apparatus through the network.

In the second invention, acquired are the picture-recording program information about the to-be-recorded program and the destination-of-provision information specifying a destination of provision where the picture-recording program information is to be provided. The picture-recording program information and the destination-of-provision information are provided to another information processing apparatus.

In the third invention, picture-recording program information about the to-be-recorded program is acquired and stored from another information processing apparatus through the network. Based on the picture-recording program information, the program is picture-recorded by scheduling.

In the fourth invention, received and registered are the picture-recording program information about the to-be-recorded program and the destination-of-provision information for specifying a destination of provision where the picture-recording program information is to be provided, sent from the first other information processing apparatus. Meanwhile, in the case that the second other information processing apparatus whose access has been accepted is determined as a destination of provision where the picture-recording program information is to be provided, the picture-recording program information recorded is sent to the second information processing apparatus through the network.

BRIEF DESCRIPTION OF THE DRAWINGS

FIG. 7 is a figure explaining the information designated by a picture-recording scheduling application of FIG. 3.

FIG. 8 is a figure showing an example of broadcast program information.

FIG. 22 is a figure showing an example of a picture-recording schedule list.

BEST MODE FOR CARRYING OUT THE INVENTION

Figure 1:
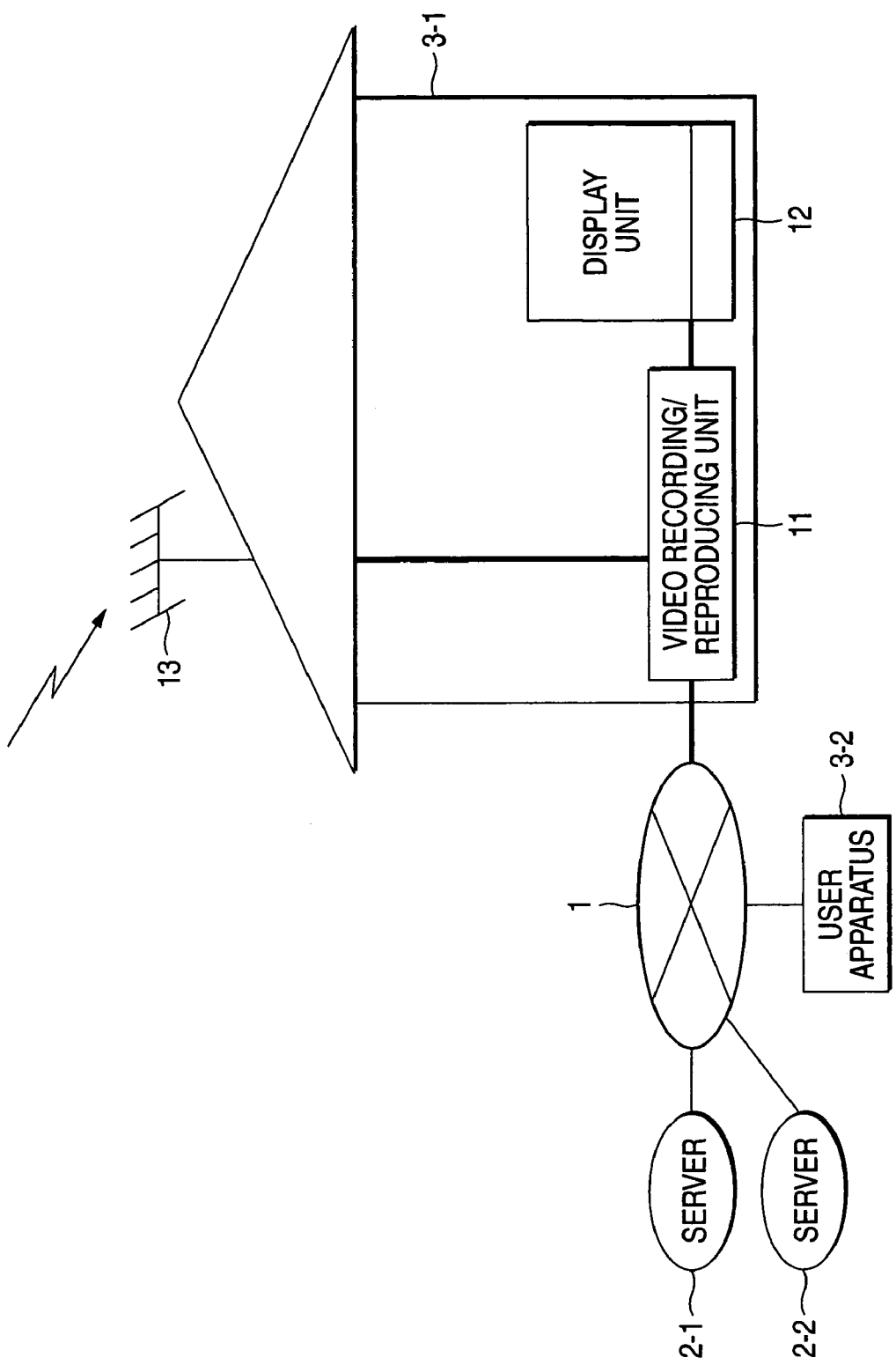
FIG. 1 is a diagram showing a configuration example of a network system to which the present invention is applied.

FIG. 1 represents a configuration example of a network system to which the present invention is applied. In this configuration example, servers 2-1, 2-2 and user apparatuses 3-1, 3-2 are connected to a network 1 configured by the Internet, a WAN (Wide Area Network), a LAN (Local Area Network) or the like. In the FIG. 1 example, although two servers 2-1, 2-2 (hereinafter, referred merely to as a server 2, where there is no need to individually distinguish these servers) and two user apparatuses 3-1, 3-2 (hereinafter, referred merely to as a user apparatus 3, where there is no need to individually distinguish these user apparatuses) are connected to the network 1, the number is arbitrary and may be three or more, respectively.

The server 2-1 provides picture-recording schedule information (picture-recording schedule information 401-1 to 401-3 of FIG. 9, hereinafter referred) and the server 2-2 provides broadcast program information (EPG (Electric Program Guide) information) respectively to the user apparatus 3 through the network 1.

The user apparatus 3 is arranged within a user's household. The user apparatus 3-1 is configured by a video recording/reproducing unit 11, a display unit 12 and an antenna 13.

The video recording/reproducing unit 11, e.g. a hard-disk video-recorder, receives a broadcast wave through the antenna 13, and stores a signal obtained by demodulation to an auxiliary storage unit 40 incorporated (see FIG. 2, hereinafter referred) and provides it to the rear-staged display unit 12 in order to make a display thereon. The display unit 12 is made by a television receiver or a monitor, for example.

Incidentally, although not shown, the user apparatus 3-2 also is configured similarly to the user apparatus 3-1.

Figure 2:
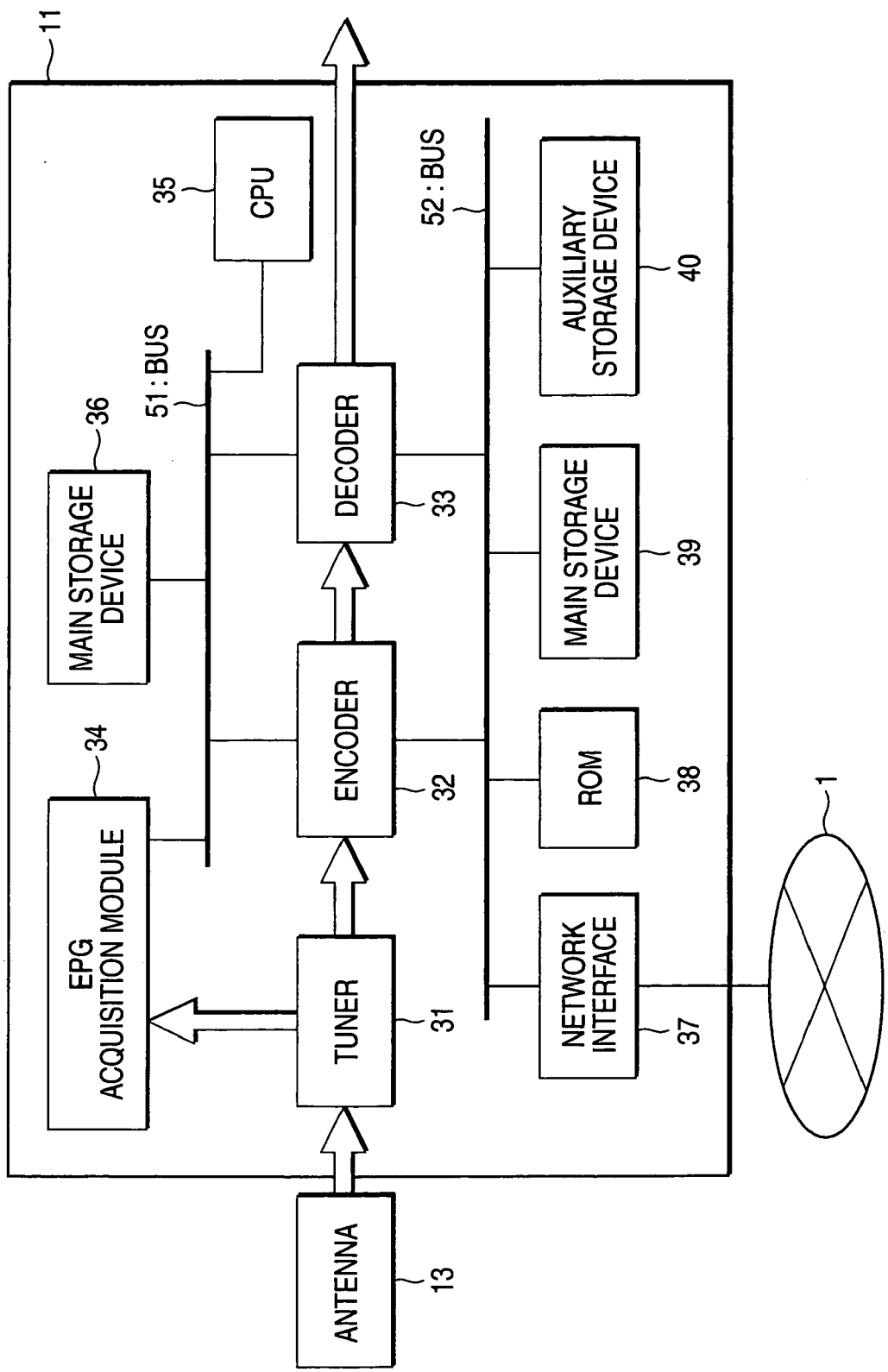
FIG. 2 is a block diagram showing a configuration example of a video recording/reproducing apparatus of FIG. 1.

The video recording/reproducing unit 11 is configured as shown in FIG. 2, for example. A tuner 31 demodulates a broadcast signal corresponding to a broadcast wave of terrestrial-wave television broadcast received by the antenna 13, and outputs a video signal component and audio signal component to an encoder 32. In the terrestrial-wave television broadcast signal received by the antenna 13, there is included EPG information in the vertical blanking period thereof. The tuner 31 outputs the EPG information to an EPG acquisition module 34.

An encoder 32 encodes the video and audio signal inputted from the tuner 31 under the MPEG (Moving Picture Experts Group) scheme for example, and supplies and stores it to the auxiliary storage device 40 through a bus 52. The auxiliary storage device 40 is configured by a hard disk, a magnetic tape, a removable disk, flash memory or the like.

The video and audio signal stored in the auxiliary storage device 40 is outputted to a decoder 33 through the bus 52 where it is decoded under the MPEG scheme and then provided to the display unit 12. The encoder 32 and decoder 33, in the case not storing a received video and audio signal to the auxiliary storage device 40, outputs a signal outputted from the tuner 31 directly to the display unit 12.

The bus 52 is connected with a main storage device 39, e.g. of RAM (Random Access Memory), and a ROM (Read Only Memory) 38. To the main storage device 39, suitably stored is the data and parameter required for the CPU (Central Processing Unit) 35 to carry out various processes. The ROM 38 is stored with the program the CPU 35 is to execute.

The bus 52 is further connected with a network interface 37 for executing an interface process to the network 1.

The CPU 35 is connected to the bus 51, together with the encoder 32, decoder 33 and EPG acquisition module 34. This bus 51 is also connected with a main storage device 36 configured by a RAM or the like.

Figure 3:
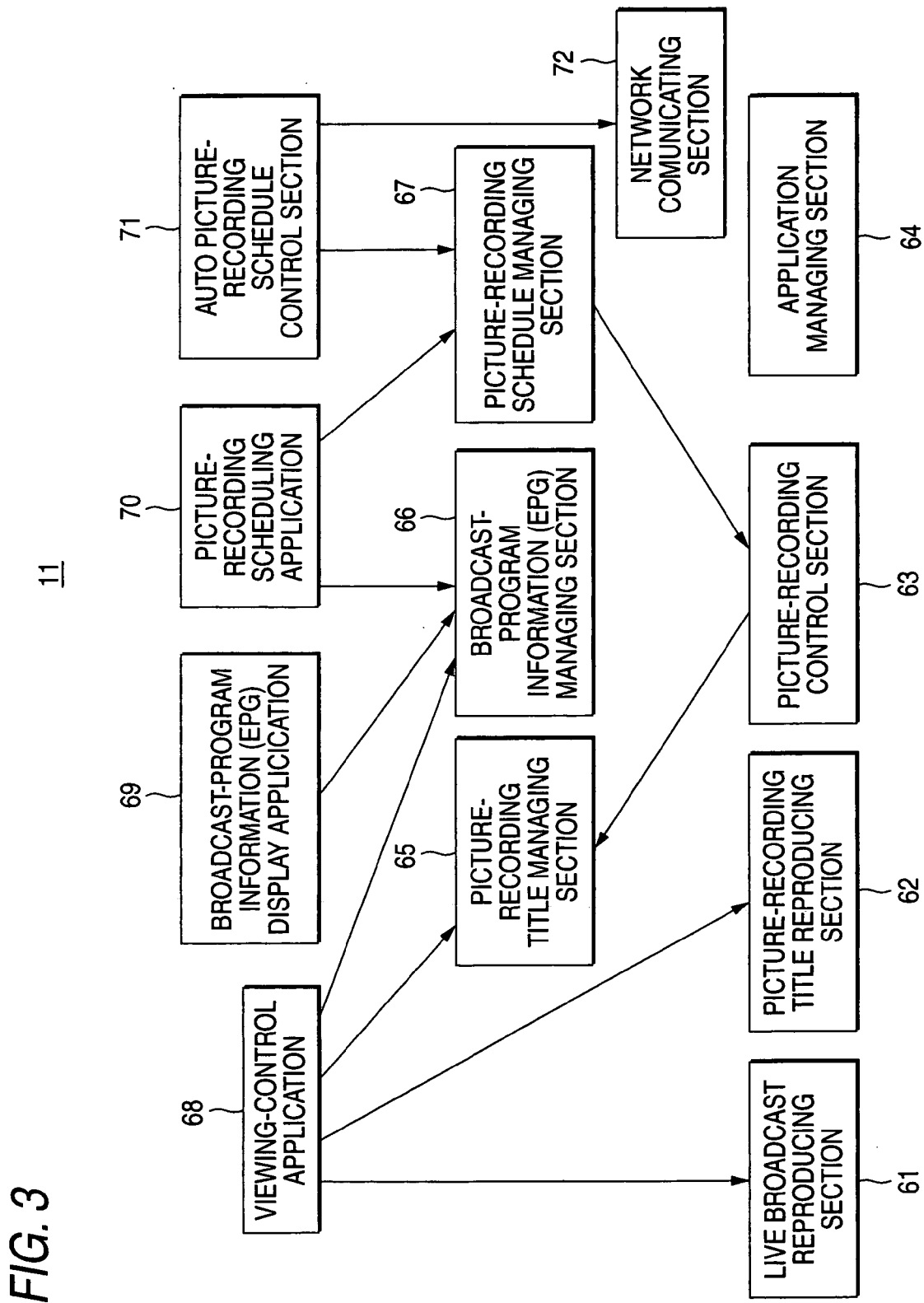
FIG. 3 is a block diagram showing a functional configuration of the video recording/reproducing apparatus of FIG. 1.

The video recording/reproducing apparatus 11 has a functional configuration centered on software, as shown in FIG. 3. A live-broadcast reproducing section 61 makes a processing of a signal being received at that time by the tuner 31 or a signal inputted from a not-shown external input terminal. A picture-recording title reproducing section 62 carries out a reproducing process of a program (title) stored in the auxiliary storage device 40. The picture-recording control section 63 executes a recording process of signals to the auxiliary storage device 40. An application managing section 64 executes a monitor process in a start-up, end and operation state of a viewing-control application 68, a broadcast-program information display application 69 and a picture-recording scheduling application 70.

The viewing-control application 68 controls the live-broadcast reproducing section 61, picture-recording title reproducing section 62, picture-recording title managing section 65 or broadcast-program information managing section 66, on the basis of an instruction from a user, to reproduce a signal being received or inputted at that time or reproduce a program stored in the auxiliary storage device 40. Meanwhile, the viewing-control application 68 controls the live-broadcast reproducing section 61, and makes reference suitably to the broadcast program information stored in the broadcast program information managing section 66 when the tuner 31 is caused to receive a broadcast program of a channel designated from the user. Furthermore, the viewing-control application 68 controls the picture-recording title reproducing section 62, and makes reference suitably to the program management information stored in the picture-recording title managing section 65 when reproducing a program stored in the auxiliary storage device 40.

The broadcast-program information display application 69 makes reference to the broadcast program information (EPG information) stored in the broadcast-program information managing section 66, and causes the display unit 12 to display broadcast-program information. The picture-recording scheduling application 70 executes a picture-recording scheduling process (prepares and registers picture-recording schedule information) on the basis of an instruction from the user. At this time, the picture-recording scheduling application 70 makes reference to the broadcast program information stored in the broadcast-program information managing section 66, as required. Meanwhile, the picture-recording scheduling application 70, when scheduling picture-recording on the basis of an operation from the user, controls the picture-recording schedule managing section 67 to execute a picture-recording scheduling process.

The picture-recording title managing section 65 manages the information about programs (titles) stored in the auxiliary storage device 40. The broadcast-program information managing section 66 manages the broadcast program information acquired by the EPG acquisition module 34. The picture-recording schedule managing section 67 controls the picture-recording control section 63 to thereby execute a picture-recording scheduling process, on the basis of the request from the program-recording scheduling application 70 or the auto picture-recoding schedule control section 71.

The auto picture-recoding schedule control section 71 carries out a picture-recording scheduling process on the basis of the picture-recording schedule information (picture-recording schedule information 401-1 to 401-3 in FIG. 9, hereinafter referred) acquired from the server 2-1. The network communicating section 72 communicates with the servers 2-1, 2-2 through the network 1, to acquire picture-recording schedule information (hereinafter-referred picture-recording schedule information 401-1 to 401-3 in FIG. 9, hereinafter referred) and broadcast program information.

Figure 4:
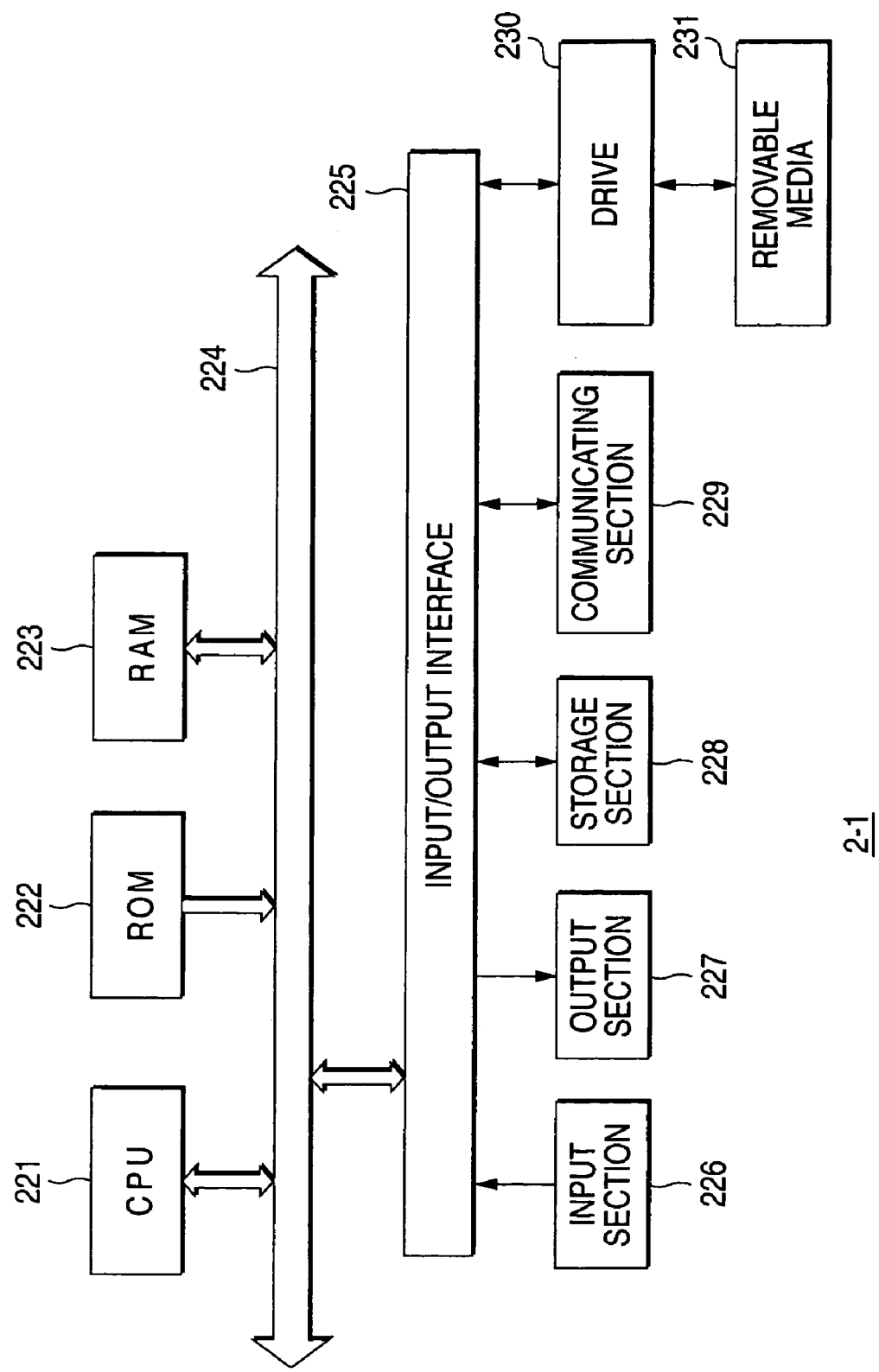
FIG. 4 is a block diagram showing a configuration example of a server 2-1 of FIG. 1.

The server 2-1 is configured as shown in FIG. 4, for example. In FIG. 4, a CPU (Central Processing Unit) 221 carries out various processes according to the program stored in a ROM (Read only Memory) 222 or the program loaded from a storage section 228 to a RAM (Random Access Memory) 223. To the RAM 223, suitably stored is the data required for the CPU 221 to execute various processes.

The CPU 221, the ROM 222 and the RAM 223 are mutually connected through a bus 224. This bus 224 is also connected with an input/output interface 225.

The input/output interface 225 is connected with an input section 226 configured by a keyboard, a mouse or the like, an output section 227 configured by a display, such as a CRT (Cathode Ray Tube) or an LCD (Liquid Crystal Display), as well as a speaker, a storage section 228 configured by a hard disk or the like, and a communicating section 229 configured by a modem or the like. The storage section 228 is stored with picture-recording schedule information (picture-recording schedule information 401-1 to 401-3 in FIG. 9, hereinafter referred) to be provided to the user apparatus 3. The communicating section 229 implements a communication process through the network 1 including the Internet.

The input/output interface 225 is also connected with a drive 230, as required, to be suitably loaded with a removable media 231, such as a magnetic disk, an optical disk, a magnetooptical disk or a semiconductor memory. The computer program read out therefrom is installed to the storage section 228, as required.

Incidentally, although showing is omitted, the server 2-2 is basically similar in configuration to the server 2-1 shown in FIG. 4.

Figure 5:
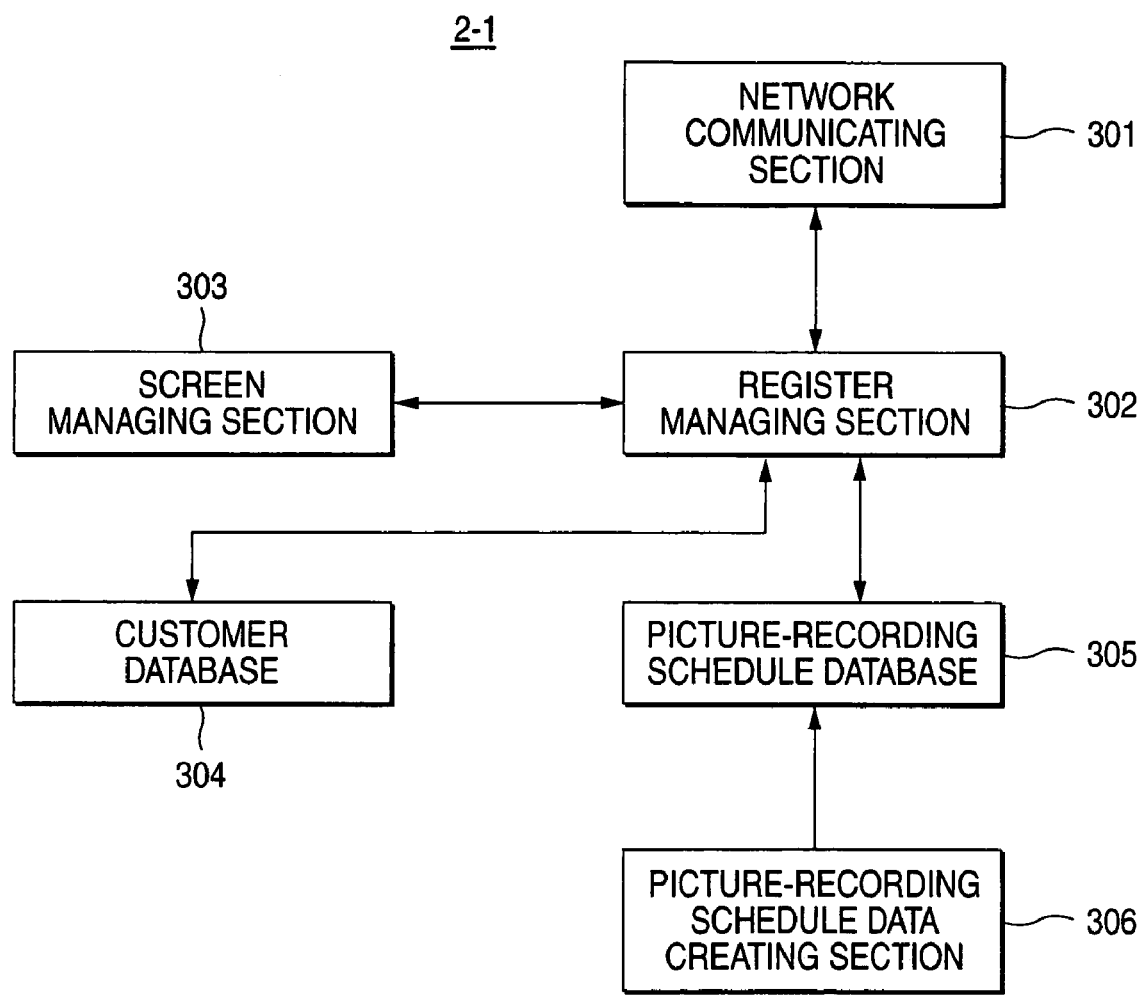
FIG. 5 is a block diagram showing a functional configuration of the server 2-1 of FIG. 1.

FIG. 5 is a block diagram showing a functional configuration of the server 2-1.

A network communicating section 301 communicates with the user apparatus 3 through the network 1, to supply it with picture-recording schedule information (picture-recording schedule information 401-1 hereinafter referred (or picture-recording schedule information 401-2, 401-3)). Also, it receives the picture-recording schedule information sent from the user apparatus 3 and the user ID sent from the user apparatus 3, through the network 1.

A register managing section 302 stores the information acquired by controlling the network communicating section 301 to a customer database 304 or picture-recording schedule database 305, and acquires the information stored in the customer database 304 or picture-recording schedule database 305 and outputs it through the network communicating section 301. Meanwhile, the register managing section 302 registers the user ID acquired from the user apparatus 3 through the network communication section 301. A screen managing section 303 manages a trust registering screen (FIG. 11 hereinafter referred) on the basis of the user ID being managed by the register managing section 302.

A picture-recording schedule data creating section 306, on the basis of an instruction by a manager, creates, by itself (regardless of the user apparatus 3), picture-recording schedule data, and stores prepared picture-recording schedule information (e.g. picture-recording schedule information 401-1 in FIG. 9 hereinafter referred) to the picture-recording schedule database 305. Of course, the picture-recording schedule information created by the other server or the like may be acquired and held through the network 1.

Figure 6:
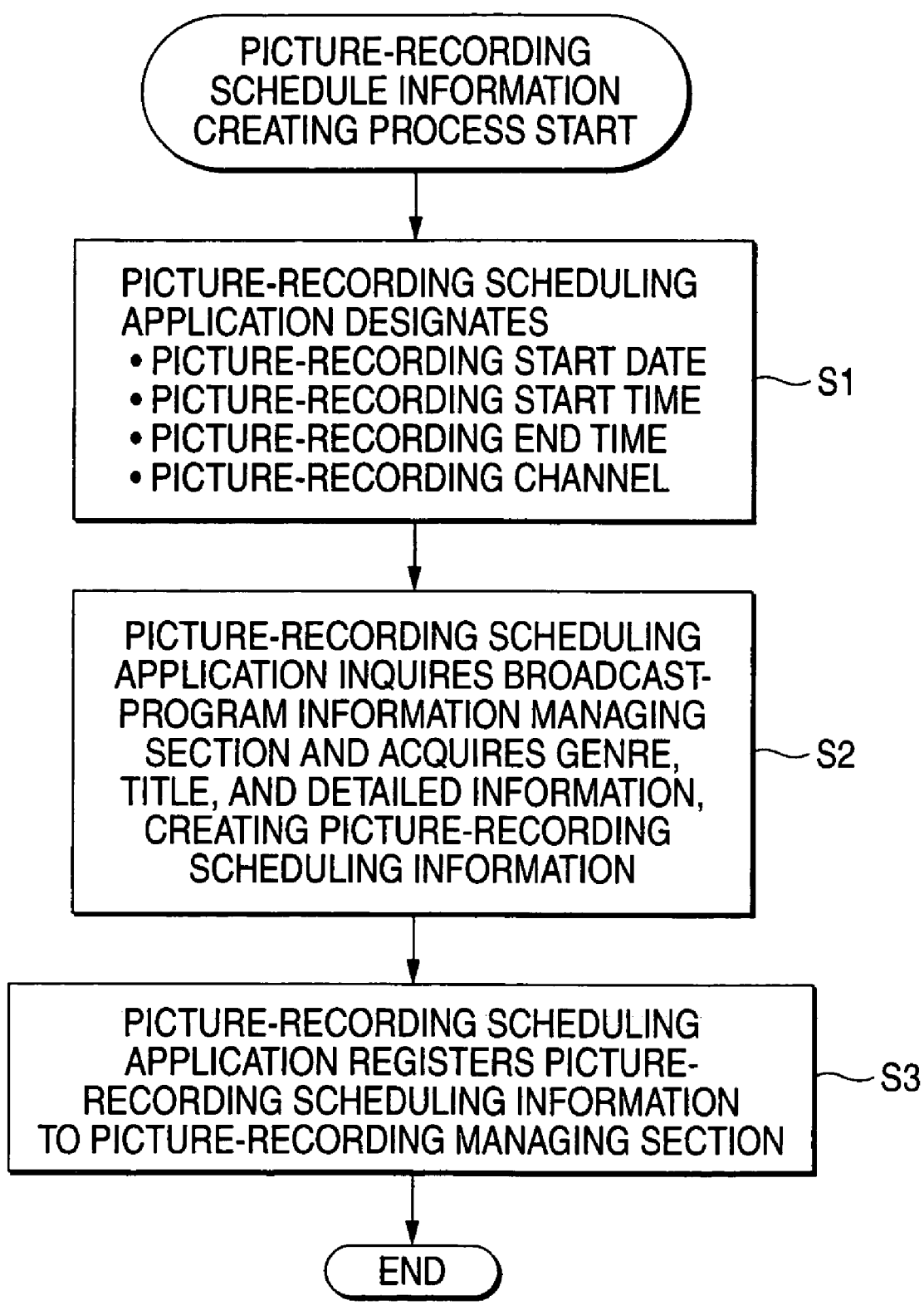
FIG. 6 is a flowchart explaining a picture-recording schedule information generating process in the video recording/reproducing apparatus of FIG. 1.

Referring now to a flowchart of FIG. 6, explained is a picture-recording schedule information creating process by the video recording/reproducing apparatus 11 of FIG. 3. Incidentally, this process is started when a picture-recording schedule command is inputted to the picture-recording scheduling application 70 by the user.

At step S1, the picture-recording scheduling application 70 designates a picture-recording start date, a picture-recording start time, a picture-recording end time and a picture-recording channel, on the basis of an instruction from the user. Specifically, such pieces of information as shown in FIG. 7 are designated. In FIG. 7 example, broadcast date is February 16 (Friday). Meanwhile, broadcast start time is 5:00 PM and end time is 6:52 PM. Furthermore, this program is to be aired at channel 1 and picture-recording mode is SP (Standard Play). Also, information is designated including extend picture-recording of "no" and protect of "yes".

At step S2, the picture-recording scheduling application 70 acquires a genre, title and detailed information (broadcast program information) stored in the broadcast-program information managing section 66 and prepares picture-recording schedule information.

FIG. 8 represents an example of such broadcast program information (EPG information). Incidentally, this FIG. 8 example represents one program of broadcast program information. In the auxiliary storage device (broadcast-program information managing section 66) 40, stored are immediately adjacent pieces of broadcast program information, e.g. programs to be aired in two days from the current time.

In the FIG. 8 example, the program is to be aired by a broadcast station TV Japan, or a broadcast date Mar. 26, 2002. Meanwhile, this program has a broadcast start time of 17:00 and an end time of 18:00. Furthermore, this program is variety in genre, having a program title of "News 17". Furthermore, there is described, as detailed information, information including "Premier Resigned, Yen's Depreciation Proceeding . . . ". The picture-recording scheduling application 70 makes reference to broadcast program information as in FIG. 8 stored in the broadcast-program information managing section 66, and prepares picture-recording schedule information.

Figure 9:
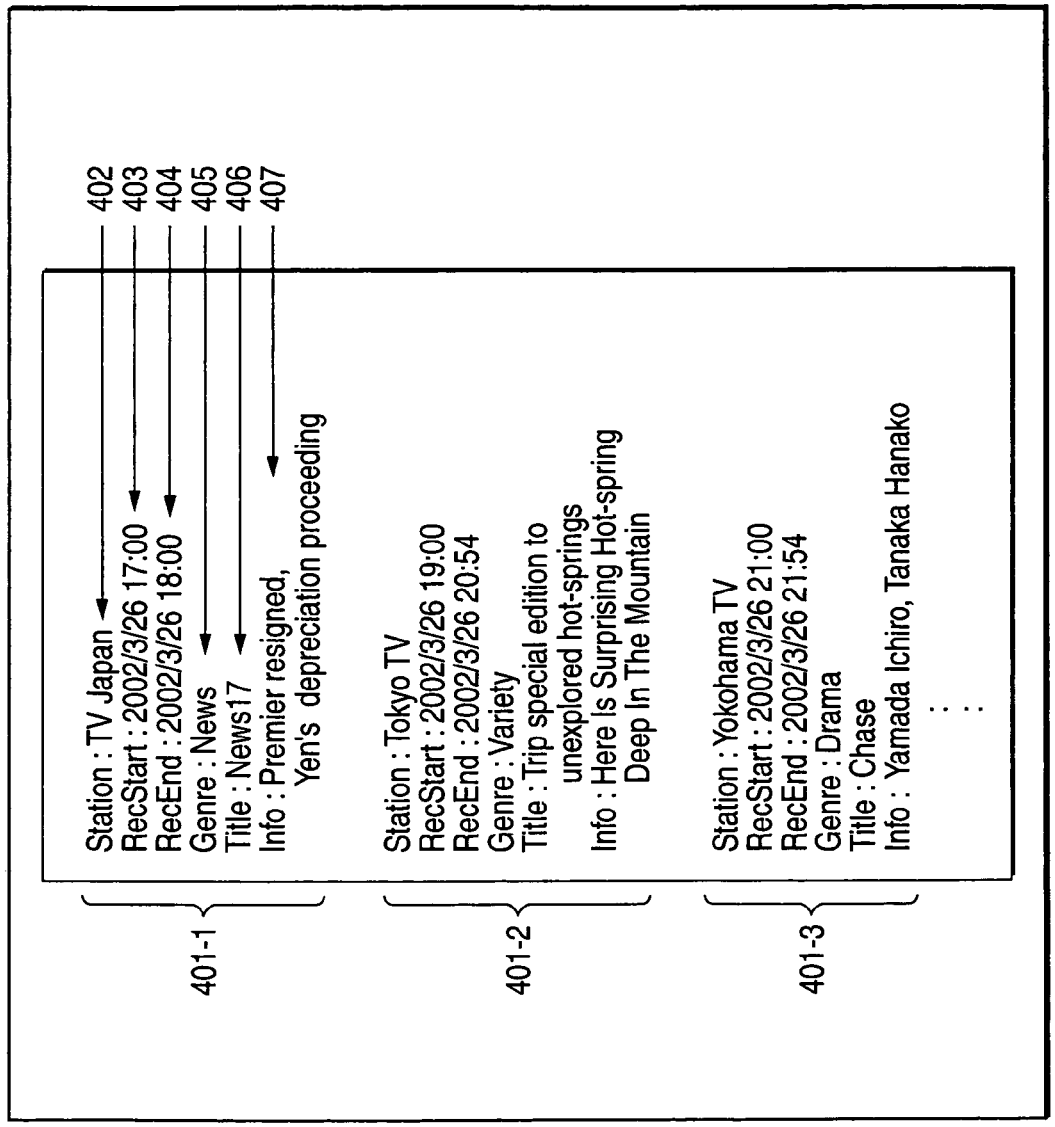
FIG. 9 is a figure showing an example of picture-recording schedule information.

At step S3, the picture-recording scheduling application 70 registers the picture-recording schedule information to the picture-recording schedule managing section 66, terminating the process. In FIG. 9 is shown an example of picture-recording schedule information registered in the picture-recording schedule managing section 66 by this process.

The picture-recording schedule information is represented by the data described by a predetermined format. The data is to be made for exchange with another video recording/reproducing apparatus through the network 1.

The picture-recording schedule information is configured by a plurality of programs of picture-recording schedule information based on one program of picture-recording schedule information, as given by picture-recording schedule information 401-1, picture-recording schedule information 401-2, picture-recording schedule information 401-3, . . . , as shown in FIG. 9. In the present example case, the broadcast program information shown in FIG. 8 is made reference to and selected by the process of step S2 in FIG. 6. By the process of step S3, this program is registered as picture-recording schedule information to the picture-recording schedule information 401-1.

The picture-recording schedule information 401-1 is configured by a broadcast station 402 to air the broadcast program, a picture-recording start time 403 of the broadcast program, a picture-recording end time 404 of the broadcast program, a genre 405 of the broadcast program, a title 406 of the broadcast program and a detailed piece of information 407 of the broadcast program. The picture-recording schedule information 401-1 and the picture-recording schedule information 401-2 are demarcated by a new line between them (between one program and one program). This allows to describe a plurality of pieces of picture-recording schedule information.

In the FIG. 9 example, the picture-recording schedule information 401-1 has a piece of information Station of "TV Japan" corresponding to the broadcast station 402 to air the program. This program has a piece of information RecStart of "Mar. 26, 2002 17:00" corresponding to the picture-recording start time 403, and a piece of information RecEnd of "Mar. 26, 2002 18:00" corresponding to the picture-recording end time 404. Also, this broadcast program has a piece of information Genre of "News" corresponding to the genre 405, and a piece of information Title of "News 17" corresponding to the title 406. Furthermore, the broadcast program has a piece of information Info of "Premier Resigned, Yen's Depreciation Proceeding" corresponding to the detailed information 407. These pieces of information are stored as picture-recording schedule information in an amount of one program.

In the case of picture-recording schedule information 401-2, the information Station corresponding to the broadcast station 402 to air the program is "Tokyo TV", the information RecStart corresponding to the picture-recording start time 403 of this program is "Mar. 26, 2002 19:00", while the information RecEnd corresponding to the picture-recording end time 404 is "Mar. 26, 2002 20:54". Meanwhile, the information Genre corresponding to the genre 405 of this broadcast program is "Variety", while the information Title corresponding to the title 406 of the broadcast program is "Trip Special Edition to Unexplored Hot-springs". Furthermore, the information Info corresponding to the detailed information 407 of the broadcast program is on information, e.g. "Here Is Surprising Hot-spring Deep in the Mountain . . . ".

In the case of picture-recording schedule information 401-3, the information Station corresponding to the broadcast station 402 to air the program is "Yokohama TV", the information RecStart corresponding to the picture-recording start time 403 of this program is "Mar. 26, 2002 21:00", while the information RecEnd corresponding to the picture-recording end time 404 is "Mar. 26, 2002 21:54". Meanwhile, the information Genre corresponding to the genre 405 of this broadcast program is "Drama", while the information Title corresponding to the title 406 of the broadcast program is "Chase". Furthermore, the information Info corresponding to the detailed information 407 of the broadcast program is on information, e.g. "Yamada Ichiro, Tanaka Hanako".

The user at the user apparatus 3, when prepared picture-recording schedule information in the above manner, is allowed to register it to the server 2-1 in order for utilization by friends, etc.

Figure 10:
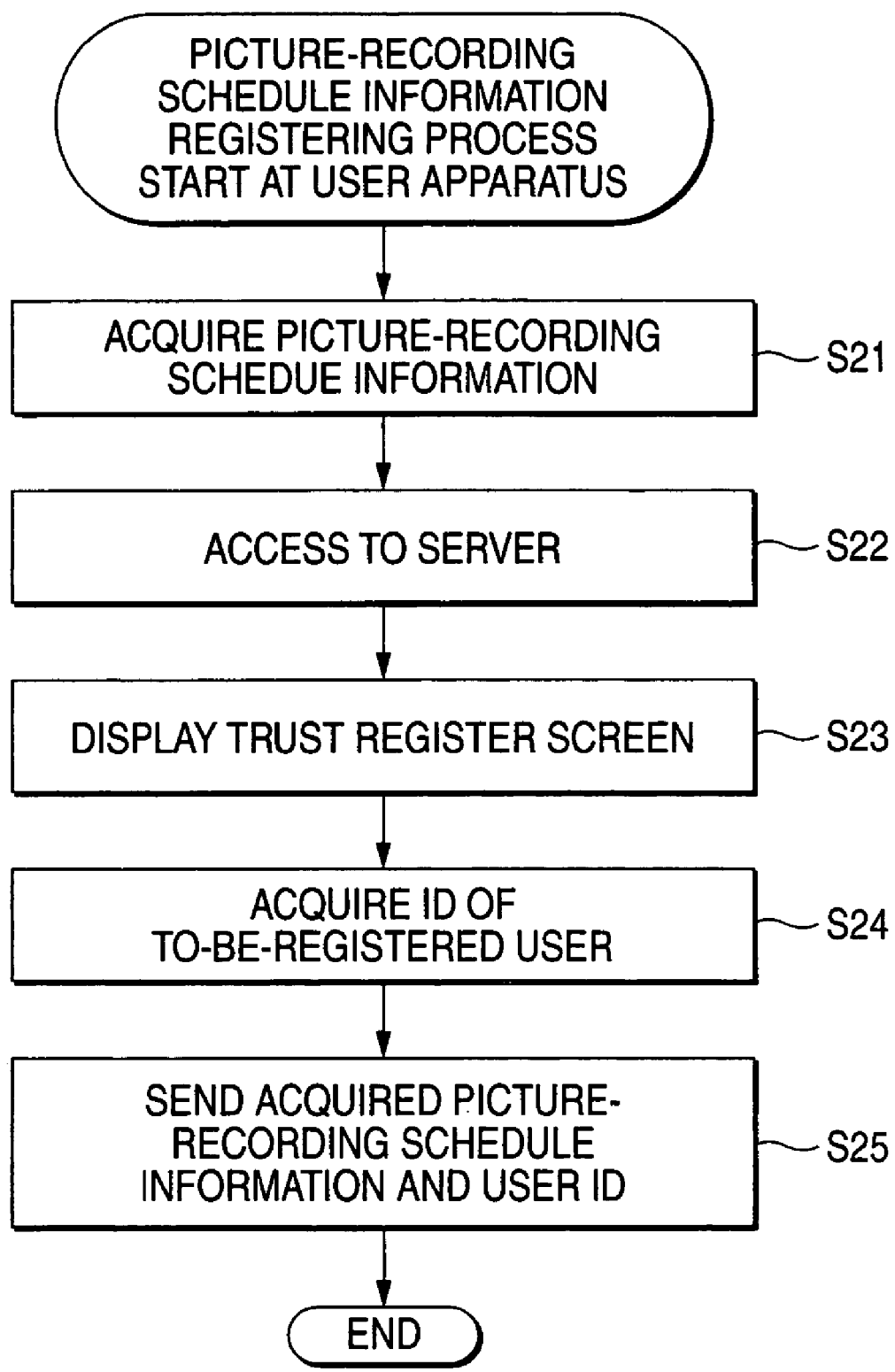
FIG. 10 is a flowchart explaining a process of registering the picture-recording schedule information in a user apparatus of FIG. 1.

Referring now to a flowchart of FIG. 10, explained is a process that the user on the user apparatus 3-2 registers the picture-recording schedule information prepared by himself/herself to the server 2-1. Incidentally, this process is commenced when a user registration is instructed by the user.

At step S21, the auto picture-recording schedule control section 71 acquires the picture-recording schedule information (e.g. picture-recording schedule information 401-1) instructed by the user. This picture-recording schedule information is made by the user himself/herself by executing the process shown in a flowchart of FIG. 6.

At step S22, the auto picture-recording schedule control section 71 controls the network communicating section 72, to access the server 2-1 through the network 1. The server 2-1 accepts the access from the user apparatus 3-2 (step S41 in FIG. 12 hereinafter referred) and sends a trust registering screen (step S42 in FIG. 12 hereinafter referred). The user apparatus 3-2 receives the trust registering screen (FIG. 11 hereinafter referred) sent from the server 2-1.

At step S23, the auto picture-recording schedule control section 71 causes the display unit 12 to display the trust registering screen sent (step S42 in FIG. 12) by the server 2-1, through the use of the broadcast-program information display application 69. An example of the trust registering screen is shown in FIG. 11.

Figure 11:
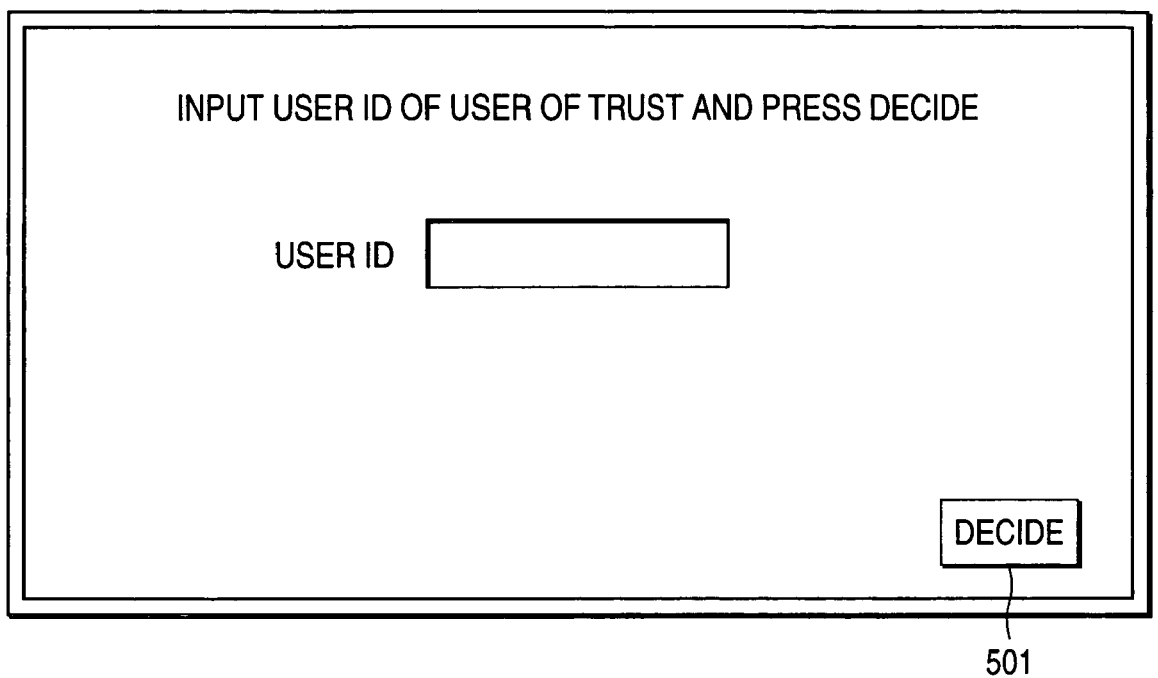
FIG. 11 is a figure showing a display example according to a process of step S23 in FIG. 10.

In FIG. 11, there is displayed a message "Input user ID of user of trust and press decide", wherein displayed is a box to input a user ID. The user inputs a user ID of another user by whom the picture-recording schedule information made by himself/herself is desired for utilization, and operates a decide button 501.

Referring back to FIG. 10, the auto picture-recording schedule control section 71 at step S24 acquires a to-be-registered user ID. Specifically, when the user inputs a user ID on the screen shown in FIG. 11 and selects the decide button 501, the auto picture-recording schedule control section 71 acquires a user ID inputted. In the present example, it is assumed that the user who is to execute this process is a user at the user apparatus 3-2 while the to-be-registered user is a user at the user apparatus 3-1 (i.e. the to-be-registered user ID is a user ID of the user on the user apparatus 3-1). This means that the user apparatus 3-2 allows to provide the picture-recording schedule information to the to-be-registered user ID. Accordingly, the user who is to utilize this service is required registered himself/herself to the server 2-1 and assigned with a user ID.

At step S25, the auto picture-recording schedule control section 71 sends the picture-recording schedule information (e.g. picture-recording schedule information 401-1) acquired by the process of step S21 and the user ID (user ID of the user at the user apparatus 3-1, in the present example case) acquired by the process of step S24, to the server 2-1. The server 2-1 receives and registers it (steps S43 and S44 in FIG. 12 hereinafter referred).

Figure 12:
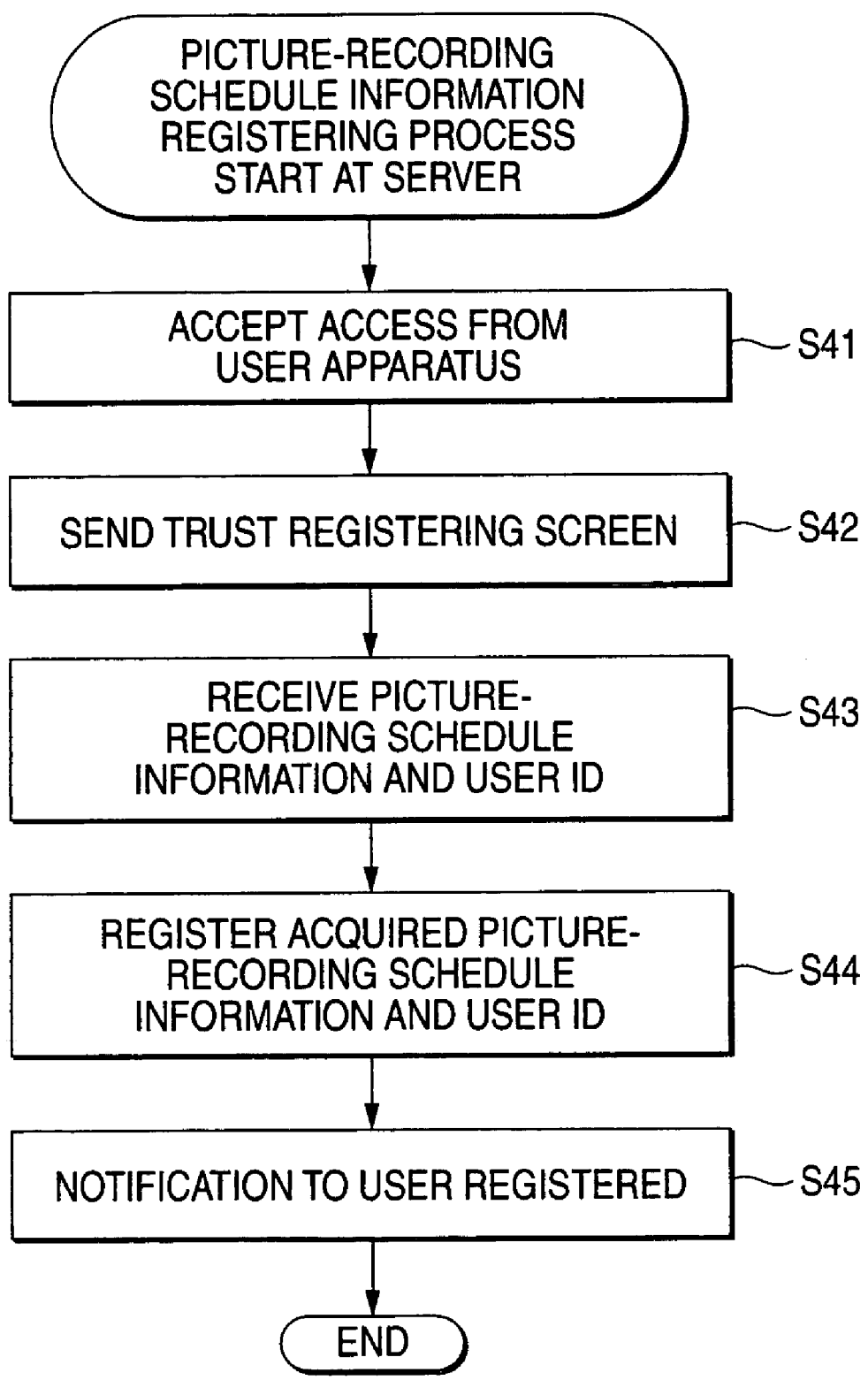
FIG. 12 is a flowchart explaining a process of registering the picture-recording schedule information in a server of FIG. 1.

Referring now to a flowchart of FIG. 12, explained is a user registering process in the server 2-1 corresponding to the process in the user apparatus 3-2 of FIG. 10. Incidentally, this process is commenced when accessed from the user apparatus 3-2.

At step S41, the network communicating section 301 accepts an access (step S22 in FIG. 10) from the user apparatus 3 (user apparatus 3-2 in the present case).

At step S42, the register managing section 302 reads out a trust registering screen (FIG. 11) under management of the screen managing section 303, and sends it to the user apparatus 3 through the network communicating section 301. Specifically, it sends the data of a trust registering screen shown in FIG. 11 noted above. The user apparatus 3 (user apparatus 3-2) receives and displays this (step S23 in FIG. 10), and acquires a to-be-registered user ID (user apparatus 3-1 in the present example) and picture-recording schedule information (e.g. picture-recording schedule information 401-1), thus sending it to the server 2-1 (step S25 in FIG. 10).

Consequently, at step S43, the register managing section 302 receives the picture-recording schedule information (e.g. picture-recording schedule information 401-1) and to-be-registered user ID through the network communicating section 301.

At step S44, the register managing section 302 acquires the picture-recording schedule information (e.g. picture-recording schedule information 401-1) and to-be-registered user ID from the network communicating section 301, and registers it to the picture-recording scheduled database 305. Specifically, it stores the picture-recording schedule information (e.g. picture-recording schedule information 401-1) to the picture-recording scheduled database 305 and registers the user ID (ID of the user apparatus 3-1) (user ID specifying the destination of provision where the program information is to be provided) to customer database 304. Due to this, in the present case, registration is made that the user having the trust of the user on the user apparatus 3-2 is a user of the user apparatus 3-1.

At step S45, the register managing section 302 controls the network communicating section 301, to notify the registered user (user apparatus 3-1 in the present example case) of a fact that registration has been made from the user apparatus 3 (user apparatus 3-2 in the present example case).

In this manner, picture-recording schedule information is registered by the process of FIGS. 10 and 12.

Figure 13:
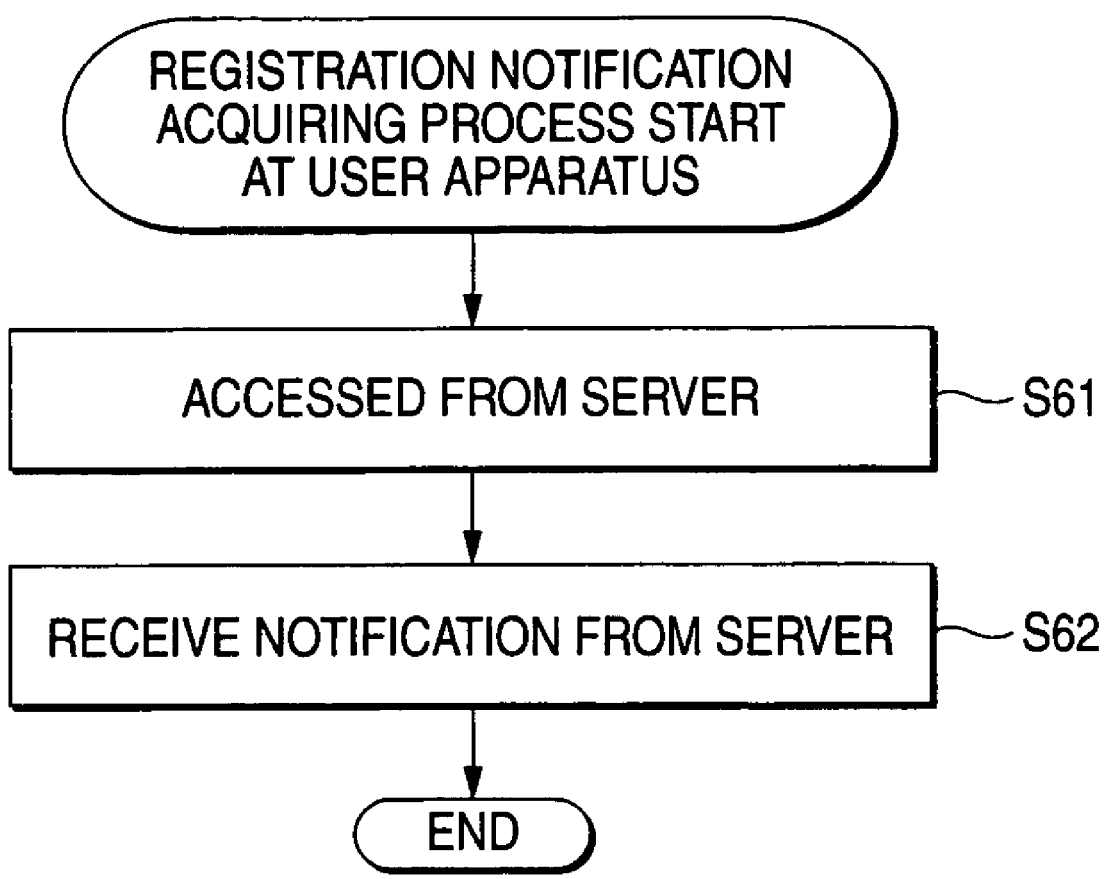
FIG. 13 is a flowchart explaining a process of registration notification acquisition in the user apparatus of FIG. 1.

Referring now to a flowchart of FIG. 13, explained is a process of the user apparatus 3 (e.g. user apparatus 3-1) to be executed correspondingly to the process of the step S45 of FIG. 12. Incidentally, this process is commenced when notification is made from the server 2-1 to the user apparatus 3 (user apparatus 3-1) which the user registered has.

At a step S61, the user apparatus 3 (user apparatus 3-1 in the present example case) accepts an access from the server 2-1 (step S45 in FIG. 12).

At step S62, the user apparatus 3 (user apparatus 3-1 in the present case) receives a notification from the server 2-1. This notification contains the information representing that picture-recording information has been registered by the user apparatus 3-2 having executed the process of FIG. 10. By receiving this notification, the user at the user apparatus 3-1 is allowed to know the fact that picture-recording schedule information has been registered by another user apparatus (user apparatus 3-2 in this case).

Figure 14:
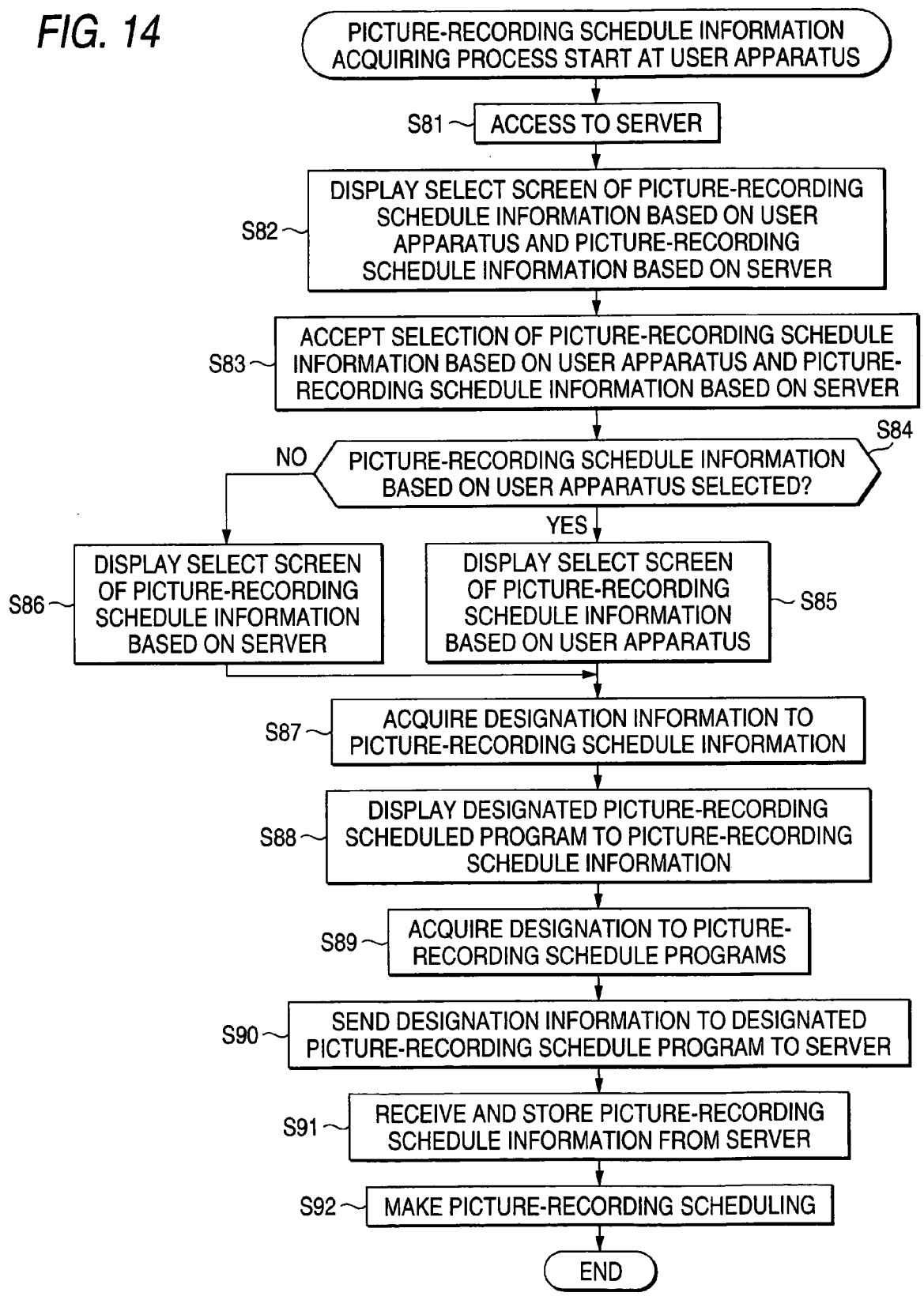
FIG. 14 is a flowchart explaining a process of picture-recording schedule information acquisition in the user apparatus of FIG. 1.

Referring now to a flowchart of FIG. 14, explained is a picture-recording schedule information acquiring process by the user apparatus 3. Incidentally, this process is commenced when instructed to make a scheduling for picture-recording by the user possessing the user apparatus 3 (e.g. user apparatus 3-1).

At step S81, the network communicating section 72 accesses the server 2-1 on the basis of an instruction by the user. The server 2-1 accepts the access (step S111 in FIG. 20 hereinafter referred). In the case determined that registration has been made as a providing destination of picture-recording schedule information (in the case rendered YES in step S112 in FIG. 20 hereinafter referred), sent to the user apparatus 3 (the user apparatus 3-2 has registered, in the present case) is picture-recording schedule information, select screen of picture-recording schedule information prepared by the server 2-1 and the data corresponding to the subsequent user's operation (step S113 in FIG. 20 hereinafter referred).

Namely, the picture-recording schedule data creating section 306 of the server 2-1 generates picture-recording schedule information as shown in FIG. 9 by itself regardless of the user apparatus 3, and registers it to the picture-recording schedule database 305. Accordingly, the general user is allowed to select and utilize any of the picture-recording schedule information prepared by another user and the picture-recording schedule information prepared in the server 2-1.

Consequently, at step S82, the network communicating section 72 receives the select screen of picture-recording schedule information by the user apparatus 3 sent from the server 2-1, and a select screen of the picture-recording schedule information by the server 2 (of course, the subsequent data corresponding to user operation may be sent from the server 2-1 each time user's operation is made). Then, broadcast-program display application 69 causes the display unit 12 to display a select screen of the picture-recording schedule information by the user apparatus 3 and of the picture-recording schedule information by the server 2.

Figure 15:
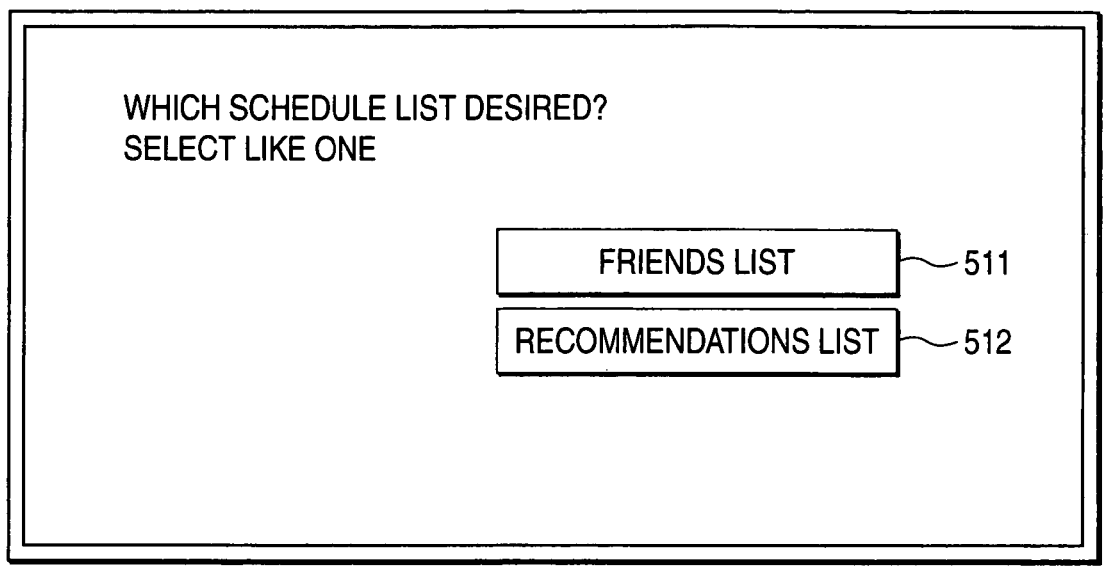
FIG. 15 is a figure showing a display example according to a process of step S82 in FIG. 14.

At this time, a display example to be displayed on the display unit 12 is shown in FIG. 15. In FIG. 15, there is displayed a message "Which Schedule List Desired? Select Like One", allowing to select Friend List button 511 and Recommendation List button 512. The Friend List button 511 corresponds to the picture-recording schedule information by the user apparatus 3 while the Recommendation List button 512 corresponds to the picture-recording schedule information by the server apparatus 2-1. Incidentally, the "schedule list" in the display example represents picture-recording schedule information.

At step S83, the auto picture-recording schedule control section 71 accepts a selection, instructed by the user, of the picture-recording schedule information by the user apparatus 3 and picture-recording schedule information by the server 2. Specifically, in the FIG. 15 example case, because the Friend List button 511 corresponds to the picture-recording schedule information by the user apparatus 3 while the Recommendation List button 512 corresponds to the picture-recording schedule information by the server 2-1, the user selects any one of those. When the user selects any one of the Friend List button 511 and the Recommendation List button 512, the broadcast-program information managing section 66 accepts it.

At step S84, the auto picture-recording schedule control section 71 determines whether or not the picture-recording schedule information by the user apparatus 3 (Friend List button 511) is selected by the user. In the case determined that the picture-recording schedule information by the user apparatus 3 (Friend List button 511) is selected, the process proceeds to step S85. The auto picture-recording schedule control section 71 controls the broadcast-program display application 69 and causes the display unit 12 to display a select screen for selecting one from among a plurality of pieces of picture-recording schedule information by the user apparatus 3.

Figure 16:
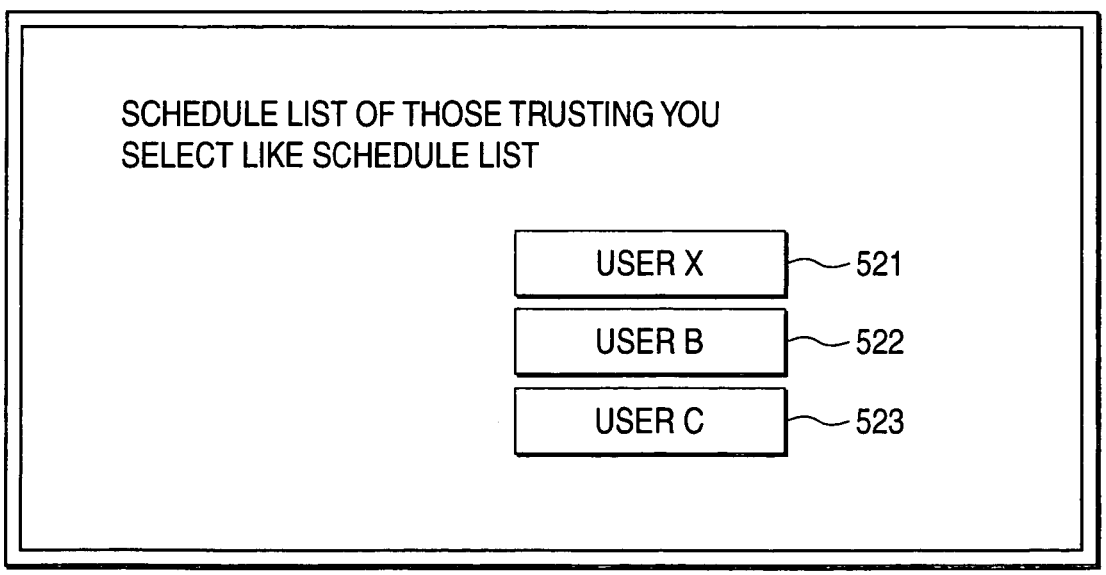
FIG. 16 is a figure showing a display example according to a process of step S85 in FIG. 14.

At this time, a screen example to be displayed on the display unit 12 is shown in FIG. 16. In FIG. 16, displayed is a message "Schedule List of Those Trusting You. Select Like Schedule List". Below the message, there are arranged a User X button 521, a user B button 522 and a user C button 523, allowing for selection. The user selects any one of the User X button 521, the user B button 522 and the user C button 523. Incidentally, the User X button 521, the user B button 522 and the user C button 523, shown in FIG. 16, are of the user names of the user IDs registered by the foregoing step S25 in FIG. 10 and step S44 in FIG. 12.

At step S87, the auto picture-recording schedule control section 71 acquires designation information for designating a predetermined one of the plurality of pieces of picture-recording schedule information, on the basis of user's operation. For example, in the case that the User B button 522 is selected by the user on the screen of FIG. 16 being displayed on the display unit 12 by the process of step S85, acquired is designation information representing that the fact the User B button 522 is selected.

Figure 17:
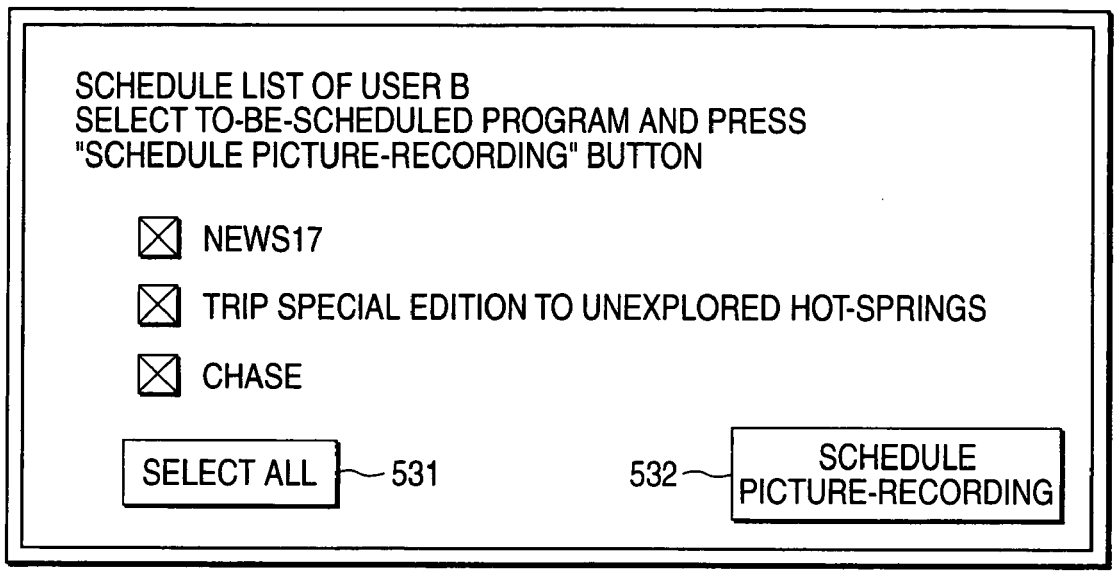
FIG. 17 is a figure showing a display example according to a process of step S88 in FIG. 14.

At step S88, the auto picture-recording schedule control section 71 controls the broadcast-program display application 69, and causes the display unit 12 to display a picture-recording schedule programs included in the designated picture-recording schedule information. For example, in the case that the User B button 522 is selected at the step S87, displayed is a screen as shown in FIG. 17. In FIG. 17, there is displayed a message "Schedule List by User B. Select Program for Scheduling and Press "Picture-Recording Schedule" button", wherein selection is allowed for any of "News 17", "Trip Special Edition to Unexplored Hot-springs" and "Chase" as a schedule list. Meanwhile, in the case that Select ALL button 531 is operated, all the programs on display (three, in this example case) are selected. A Picture-recording Schedule button 532 is operated when to fix a selection.

Meanwhile, at step S84, in the case determined that the picture-recording program information by the user apparatus 3 is not selected (in the case determined that the picture-recording program information by the server 2-1 (Recommendation List button 512) is selected, the process proceeds to step S86. The display unit 12 of the user apparatus 3 is caused to display a select screen of the picture-recording program information by the server 2-1 (Recommend List button 512).

Figure 18:
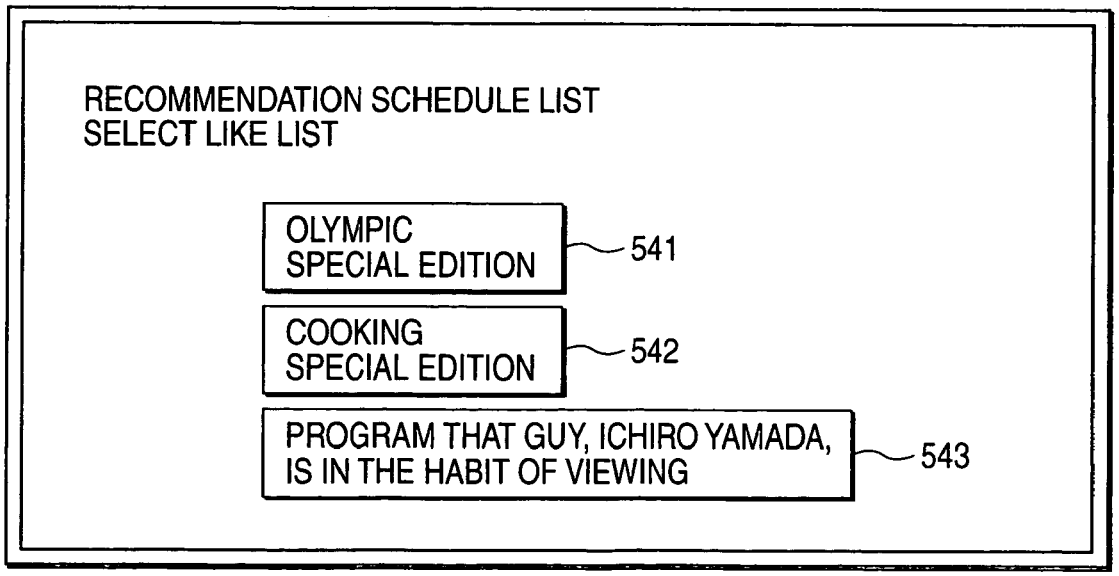
FIG. 18 is a figure showing a display example according to a process of step S86 in FIG. 14.

At this time, displayed is a screen as shown in FIG. 18 for example. In the display example of FIG. 18, there is displayed a message "Recommendations Schedule List. Select Like Schedule List", wherein selection is allowed for any one of an Olympic Special Edition button 541, a Cooking Program button 542 and a Program That Yamada Ichiro Viewing button 543. The user selects one or more programs out of these.

Incidentally, in the case that the picture-recording schedule information from another user apparatus 4 is not registered in the server apparatus 2-1, the server 2-1 sends the picture-recording schedule information prepared by the server 2-1 itself to the user apparatus 3 (steps S112, 114 in FIG. 20 hereinafter referred). In this case, the process of steps S82, 83 is passed through and, at step S84, determination is made NO, to execute the process of step S86.

After the process of step S86, the process proceeds to step S87. The auto picture-recording schedule control section 71 acquires the designation information to picture-recording schedule information instructed by the user. For example, on the screen of FIG. 18 displayed on the display unit 12 by the process of step S86, in the case that the Olympic Special Edition button 541 is selected by the user, the fact is acquired that the Olympic Special Edition button 541 has been designated.

Figure 19:
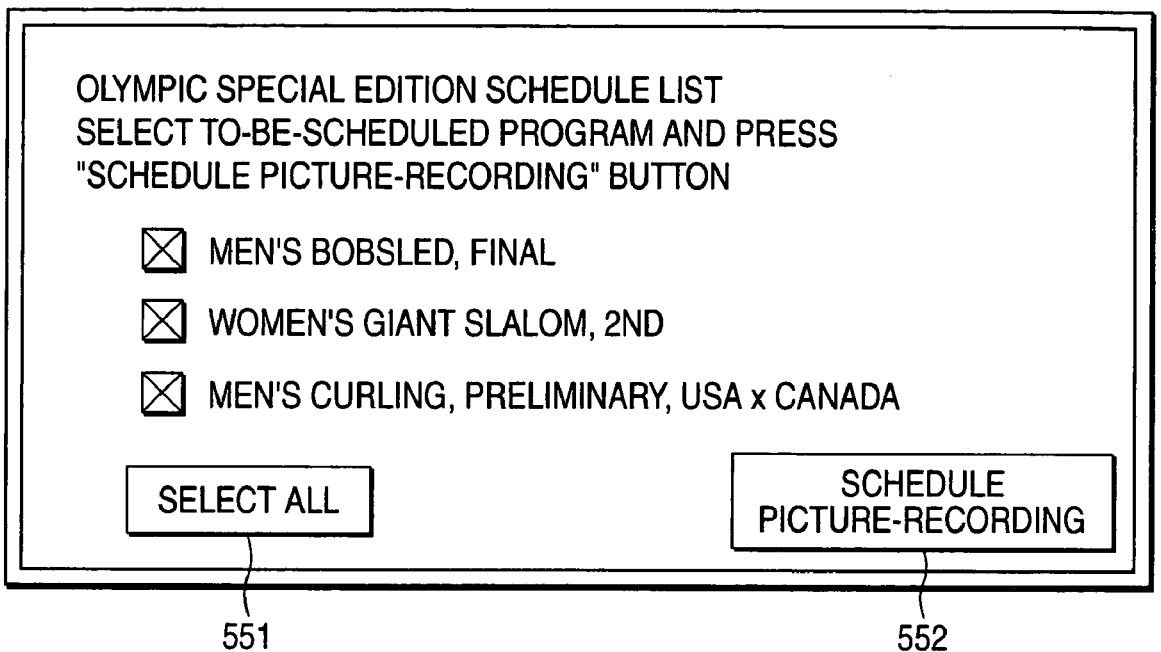
FIG. 19 is a figure showing other display example according to a process of step S88 in FIG. 14.

At step S88, the auto picture-recording schedule control section 71 controls the broadcast-program display application 69 and causes the display unit 12 of the user apparatus 3 to display the recording-program schedule programs of designated picture-recording schedule information. For example, in the case that the Olympic Special Edition is selected at the step S87, displayed is a screen example as shown in FIG. 19. In the FIG. 19 example, there is displayed a massage, "Olympic Special Edition Schedule List. Select Program Desired for Schedule and Press "Picture-recording Schedule" button", wherein selection is allowed for any of "Men's Bobsled, Final", "Women's Giant Slalom, Second", "Men's Curling, Preliminary, USA×Canada" as a schedule list. Meanwhile, configuration is provided to select a Select All button 551 and a Schedule Picture-recording button 552.

At step S89, the auto picture-recording schedule control section 71 acquires a designation to picture-recording schedule programs. In the case passed through the process of the step S85, when "Trip Special Edition to Unexploded Hot-springs" is selected in FIG. 17 by the user, the user apparatus 3 acquires a designation of "Trip Special Edition to Unexploded Hot-springs". Meanwhile, in the case passed through the process of step S86, when "Men's Bobsled, Final" is selected in FIG. 19 by the user, the user apparatus 3 acquires a designation of "Men's Bobsled, Final".

At step S90, the network communicating section 72 sends the designation information to the designated picture-recording schedule program to the server 2-1. In the case that "Trip Special Edition to Unexploded Hot-springs" is acquired by the process of step S89 (in the case of FIG. 17 example), the user apparatus 3 sends the designation information of "Trip Special Edition to Unexploded Hot-springs" to the server 2-1. In the case that "Men's Bobsled, Final" is acquired by the process of step S89 (in the case of FIG. 19 example), the user apparatus 3 sends the designation information of "Men's Bobsled, Final" to the server 2-1. The server 2-1 receives this (step S115 in FIG. 20 hereinafter referred), and sends picture-recording schedule information to the user apparatus 3 (step S116 in FIG. 20 hereinafter referred).

Consequently, at step S91, the auto picture-recording schedule control section 71 receives the picture-recording schedule information (e.g. picture-recording schedule information 401-1 in FIG. 9) sent from the server 2-1 through the network communicating section 72. The picture-recording schedule managing section 67 stores it to the picture-recording schedule database 305. This picture-recording schedule information is picture-recording schedule information of a program corresponding to the designation information to the designated picture-recording schedule program sent by the process of step S90.

At step S92, the picture-recording schedule managing section 67 makes a picture-recording scheduling on the basis of the picture-recording schedule information received and stored by the process of step S91. Namely, the information received is registered to the picture-recording schedule list so that picture-recording operation can be started when a predetermined time comes.

Figure 20:
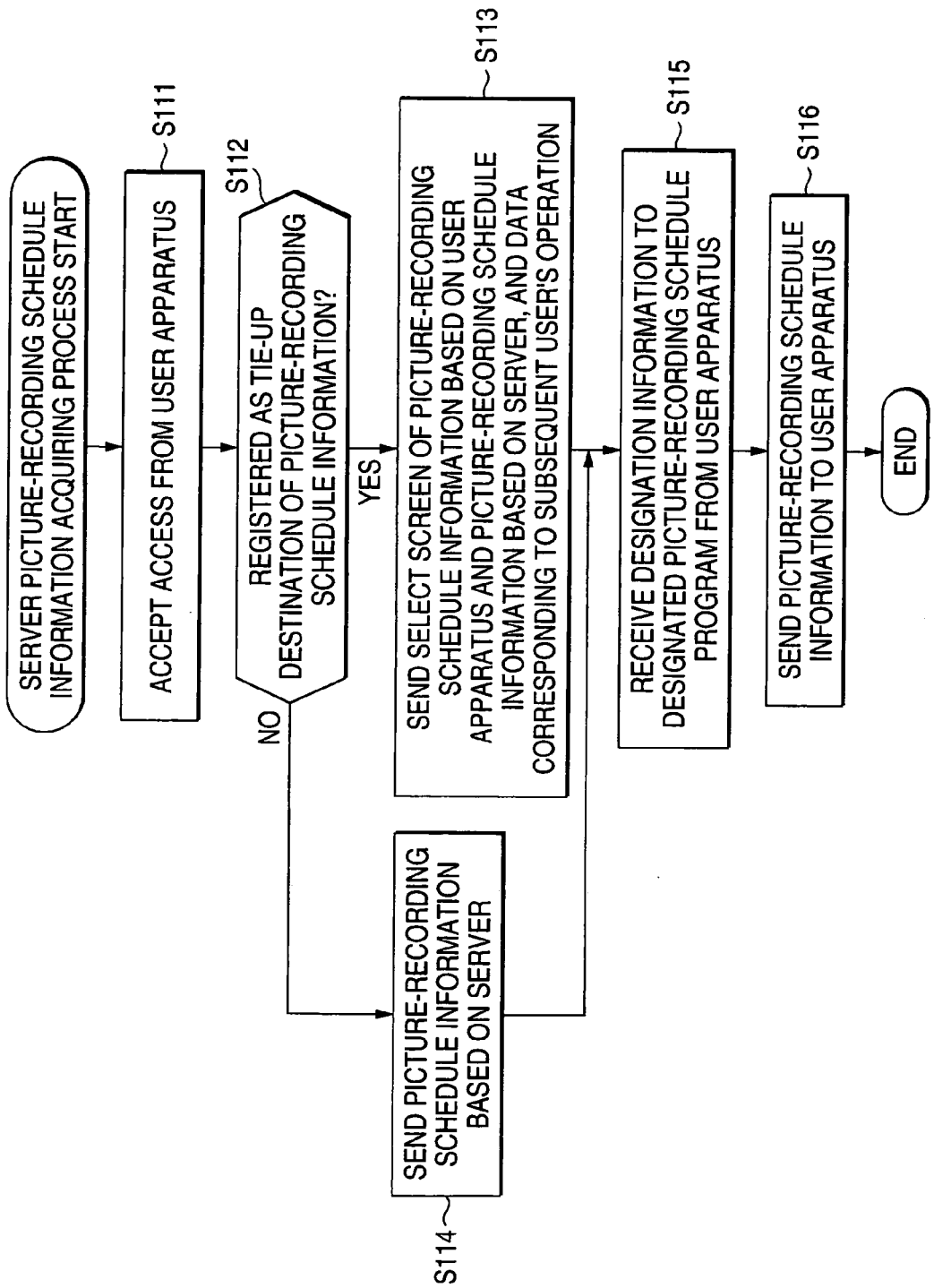
FIG. 20 is a flowchart explaining a picture-recording schedule information acquisition process in the server of FIG. 1.

Referring now to a flowchart of FIG. 20, explained is a picture-recording schedule information acquiring process by the server 2-1 corresponding to the process of FIG. 14 to be executed by the user apparatus 3. Incidentally, this process is commenced when accessed from the user apparatus 3 (user apparatus 3-1, in the present case) by the process of step S81 of FIG. 14.

At step S111, the network communicating section 301 accepts an access (step S81 of FIG. 14) from the user apparatus 3. For example, it accepts an access from the user apparatus 3-1.

At step S112, the register managing section 302 determines whether or not the user apparatus 3 having accessed (user apparatus 3-1, in the present example case) has been resistered as a providing destination of picture-recording schedule information. Specifically, the register managing section 302 makes reference to the customer database 304 and determines whether or not the user apparatus 3 (user apparatus 3-1, in the present example case) has been registered as a providing destination of picture-recording schedule information. In the case determined that the user apparatus 3 (user apparatus 3-1, in the present example case) has been registered as a providing destination of picture-recording schedule information, the process proceeds to step S113, to send picture-recording schedule information based on the user apparatus 3 (picture-recording schedule information corresponding to the user apparatus 3-1, in the present example case), a select screen of picture-recording schedule information based on the server 2-1, and further the data corresponding to the subsequent user's operation. The "data corresponding to the subsequent user's operation", herein, means a select screen of picture-recording schedule information by the server 2-1 to be further displayed in the case the picture-recording schedule information based on the server 2-1 is selected (the data required for display in the process of step S86), and a select screen of picture-recording schedule information based on the user apparatus 3 to be further displayed in the case the picture-recording schedule information based on the user apparatus 3-1 is selected (the data required for display in the process of step S85).

The user apparatus 3 receives those and displays a select screen of the picture-recording schedule information based on the user apparatus 3 and of the picture-recording schedule information based on the server (step S82 in FIG. 14) on the display unit 12, making one be selected. It further makes a picture-recording schedule program of the selected picture-recording schedule information be designated, and sends the designation information to a designated picture-recording schedule program (step S90 in FIG. 14).

Meanwhile, at step S112, in the case determined that the user apparatus 3 (user apparatus 3-1, in the present example case) has not been registered as a providing destination of picture-recording schedule information, the process proceeds to step S114 where the register managing section 302 sends the picture-recording schedule information based on the server 2-1. Namely, in this case, sent is only the picture-recording schedule information corresponding to the Recommendation List button 512 in FIG. 15. The user apparatus 3 receives this and displays the picture-recording schedule information based on the server 2-1 on the display unit 12 (step S82 in FIG. 14) to thereby make a picture-recording schedule program be designated and send designation information to a designated picture-recording schedule program (step S90 in FIG. 14).

After the process of step S113 or step S114, the network communicating section 301 at step S115 receives the designation information of the designated picture-recording schedule program from the user apparatus 3-1. The register managing section 302 reads the picture-recording scheduling information of that program (e.g. picture-recording scheduling information 401-1 in FIG. 9) from the picture-recording schedule database 305 on the basis of the designation information.

At step S116, the register managing section 302 sends the picture-recording scheduling information (e.g. picture-recording schedule information 401-1 in FIG. 9) read out in the process of step S115, to the user apparatus 3 through the network communicating section 301. This picture-recording scheduling information is received by the user apparatus 3, and picture-recording scheduling process is implemented based thereon (step S91, 92 in FIG. 14).

Incidentally, it is also possible to previously send all the programs of picture-recording schedule information to the user apparatus 3 by the process of the step S113, 114. In this case, because picture-recording schedule information can be selected to the program required for the user apparatus 3 itself, the process of step S115, S116 can be omitted. Meanwhile, in also the user apparatus 3, the process of step S90, 91 in FIG. 14 is omitted. However, in this case, there is an increase in amount of the data to be communicated.

By the process of FIGS. 14 and 20, the user apparatus 3 acquires from the server 2-1 the select information for selecting a program registered in the picture-recording schedule information, and sends the designation information of a selected picture-recording schedule program to the server 2-1 so that the picture-recording schedule information of that program is received at the server 2-1 thereby implementing picture-recording scheduling. Due to this, the program for picture-recording can be selected not only from the picture-recording schedule information based on the user apparatus 3 but also from the picture-recording schedule information based on the server 2-1. The user is allowed to share the same program with another user by providing picture-recording schedule information to the other user. Meanwhile, in the case to utilize the picture-recording schedule information of from another user, it is possible to omit the labor and time for preparing picture-recording schedule information by himself/herself.

Figure 21:
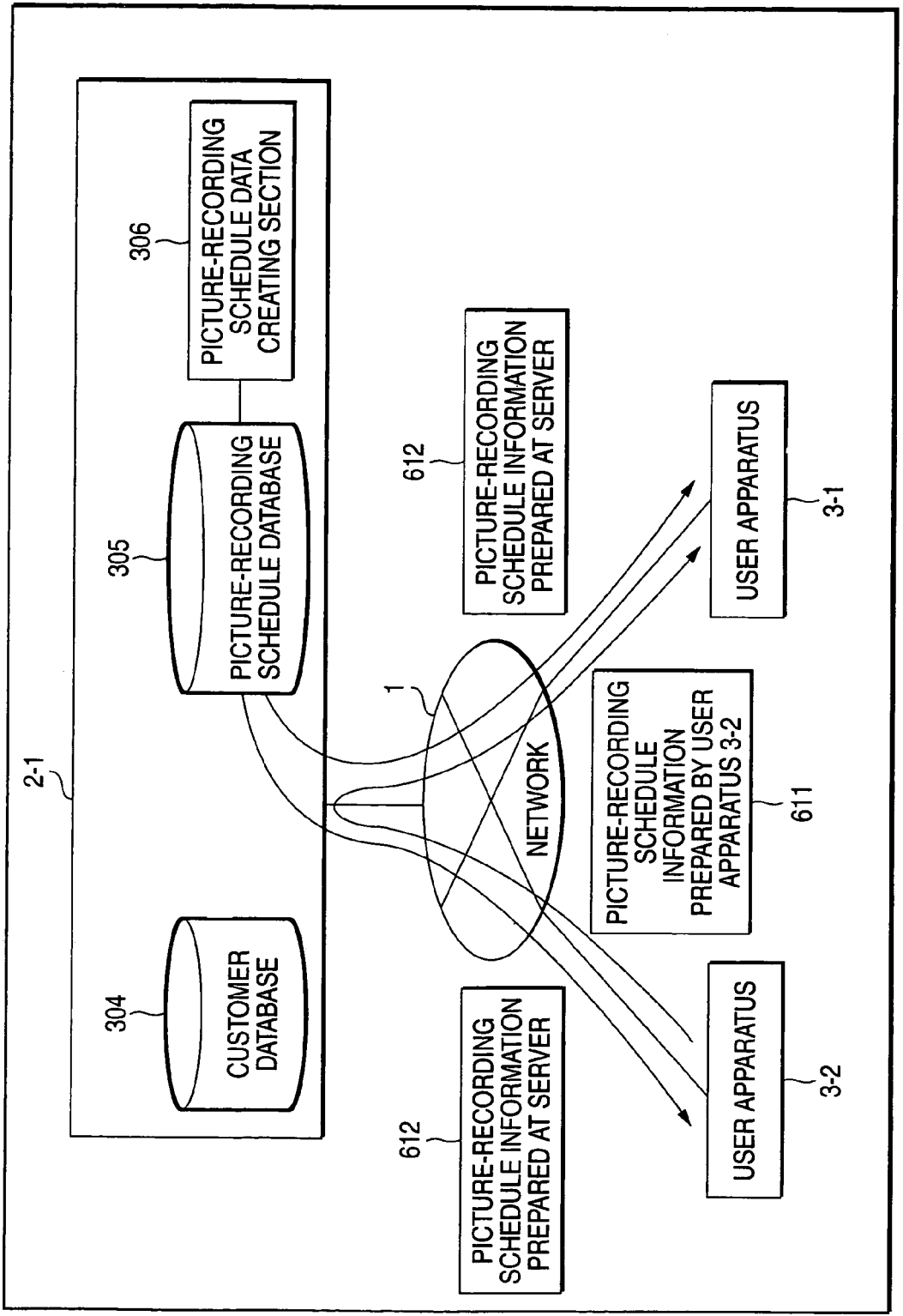
FIG. 21 is a figure explaining a picture-recording schedule information registration process.

The above process, if summarized, is as follows. Namely, as shown in FIG. 21, the customer database 304 and the picture-recording schedule database 305 are held in the server 2-1. The customer database 304 is stored with the customer data of the user apparatus 3-1 and user apparatus 3-2. This can restrict the user allowed to use picture-recording schedule information. The user apparatus 3-2 supplies the picture-recording schedule information prepared by itself (e.g. picture-recording schedule information prepared by the process of FIG. 6) to the server 2-1 through the network 1. The server 2-1 registers this to the picture-recording schedule database 305. Receiving a notification of registering the picture-recording schedule information from the server 2-1 or voluntarily at a required timing as required, when the user apparatus 3-1 accesses the server 2-1, the server 2-1 sends at least one of the picture-recording program information corresponding to a plurality of pieces of picture-recording schedule information prepared by the user apparatus 3-2 (user registered in the customer database 304) and the picture-recording program information corresponding to the picture-recording schedule information prepared by the server 2-1 (step S113, 114 in FIG. 20).

The user apparatus 3-1 selects the picture-recording program information corresponding to a plurality of pieces of picture-recording schedule information prepared by the user apparatus 3 registered (user apparatus 3-2, in the FIG. 21 example case) or the picture-recording program information corresponding to the picture-recording schedule information by the server 2-1, to further designate a recorded program from the picture-recording program information and send designated designation information to the server 2-1 (step S90 in FIG. 14).

The server 2-1 receives this. In the case that the picture-recording program information based on the user apparatus 3 is designated (Friend List button 511 operated, in the FIG. 15 example case) (in the case rendered YES in step S84 in FIG. 14), the picture-recording schedule information 611 corresponding to the designated program stored in the picture-recording schedule database 305 is acquired and sent to the user apparatus 3-1 through the network 1. The user apparatus 3-1 receives this and causes the auto picture-recording schedule control section 71 to carry out a picture-recording process.

In the case that the picture-recording program information based on the server 2-1 is designated (Recommendation List button 512 operated, in the FIG. 15 example case) (in the case rendered NO in step S84 in FIG. 14), the server 2-1 sends the picture-recording schedule information 612 prepared by itself to the user apparatus 3-1 through the network 1. The user apparatus 3-1 receives this and causes the auto picture-recording schedule control section 71 to carry out a picture-recording process.

Meanwhile, the user apparatus 3-2 can acquire the picture-recording schedule information 612 prepared by the server 2-1, and carry out a picture-recording process. In this case, in case the user apparatus 3-2 accesses the server 2-1, the server 2-1 determines whether the user apparatus 3-2 is registered as an information providing destination of program in the customer database 304 or not (e.g. step S112 in FIG. 20). In the case determined not registered, the picture-recording program information based on the server 2-1 is sent (step S114 in FIG. 20). By receiving and selecting this, the user apparatus 3-1 acquires the picture-recording program information 612 prepared by the server 2-1. Then, the auto picture-recording schedule control section 71 carries out a picture-recording schedule process. Incidentally, of course, instead of sending the picture-recording schedule information prepared by the server 2-1 to all the user-registered users of user apparatuses 3, the picture-recording schedule information may be defined with a providing destination by the server 2-1 so that the picture-recording schedule information be sent only to the user apparatus 3 registered as a providing destination.

Incidentally, the manager on the server 2-1 is allowed to charge fees to the user on the user apparatus 3 and gain a profit, as required.

As in the above, the user apparatus 3 acquires picture-recording schedule information through the server 2-1, and makes the auto picture-recording schedule control section 71 implement a picture-recording process. Meanwhile, it acquires the picture-recording schedule information prepared by the user himself/herself, and makes the auto picture-recording schedule control section 71 implement a picture-recording process. The auto picture-recording schedule control section 71 causes the picture-recording schedule managing section 67 to prepare a picture-recording schedule list as shown in FIG. 22.

In the FIG. 22 example, there are recorded broadcast date, broadcast station, broadcast start time and broadcast end time of the programs to be scheduled for picture recording. For example, there is registered, as a program scheduled for picture-recording, a program to be aired at from 16:00:00 to 16:00:30:00, Jul. 1, 2002 by broadcast station TV Japan.

Incidentally, of course, it is possible for the user to designate individually predetermined programs through the picture-recording scheduling application 70 and register those to a picture-recording schedule list.

Figure 23:
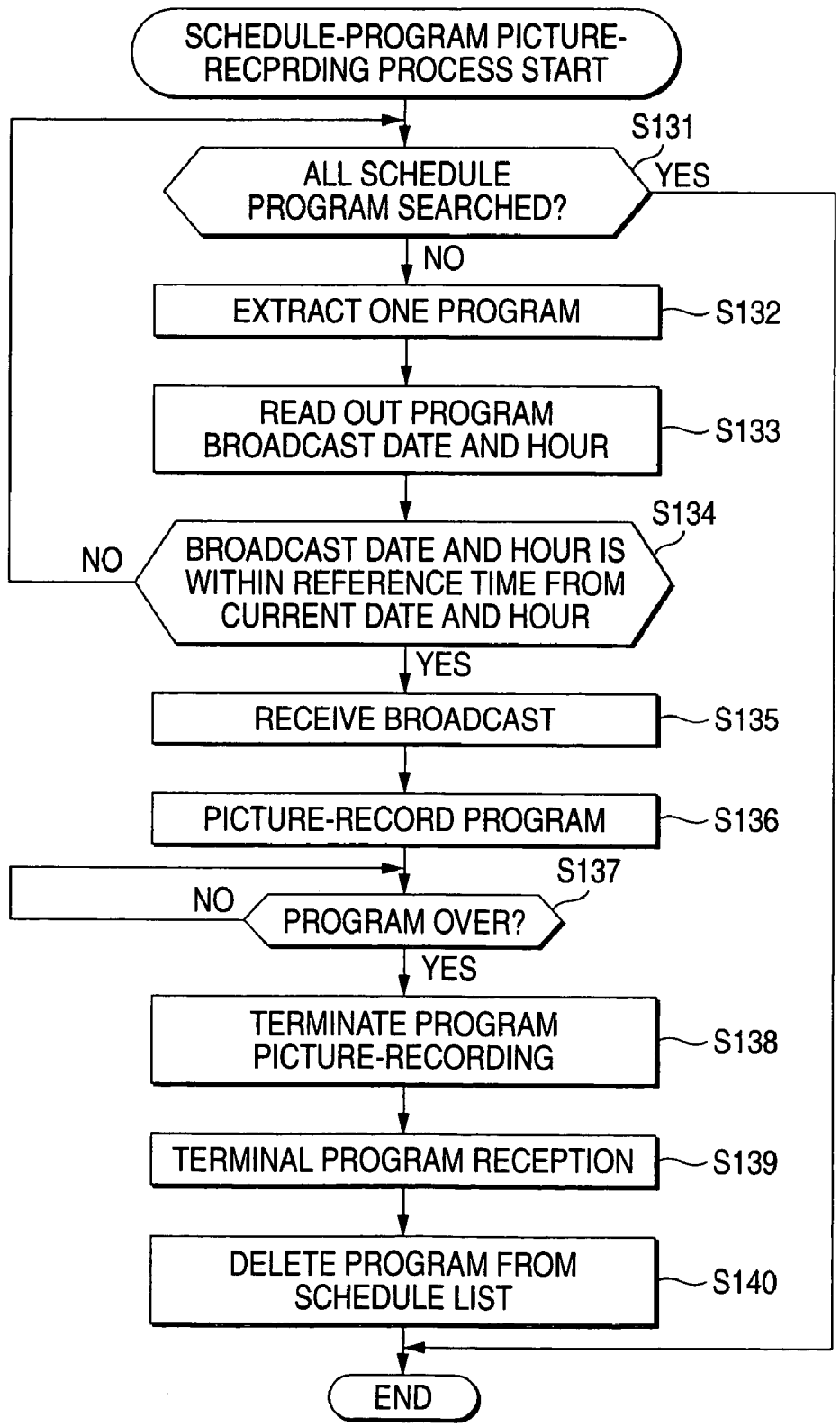
FIG. 23 is a flowchart explaining a process of picture-recording a scheduled program in the video recording/reproducing apparatus of FIG. 1.

In case a picture-recording schedule list is prepared in the above manner, the picture-recording schedule managing section 67 executes a picture-recording process of scheduled programs. Referring now to a flowchart of FIG. 23, explained is the picture-recording process of scheduled programs. Incidentally, the process shown in the flowchart of FIG. 23 is carried out periodically at a constant time interval.

At step S131, the picture-recording schedule managing section 67 determines whether all the programs scheduled in the picture-recording schedule list have been searched or not. In the case that there is a scheduled program not yet searched for, the process proceeds to step S132 where the picture-recording schedule managing section 67 extracts one program from the picture-recording schedule list. At step S133, the picture-recording schedule managing section 67 reads out a broadcast date and hour of the program extracted in the process of step S132. For example, in the case that the program designated at number 1 in FIG. 22 is extracted in the process of step S132, its broadcast date and broadcast start time of Jul. 1, 2002, 16:00:00 is read out as a broadcast date and hour in the process of step S133.

At step S134, the picture-recording schedule managing section 67 reads the current date and hour from a built-in timer, and determines whether the broadcast date and hour read in the process of step S133 is within a reference time from the current time and hour. The reference time is a comparatively short time, e.g. 30 seconds or 1 minute. The reference time is determined by taking account of the required time of from actually staring the picture-recording process to an instruction of control through the picture-recording control section 63.

In the case that the broadcast date and hour is not within a reference time from the current time and hour, the process returns to step S131, to repetitively execute the subsequent process.

For example, in case the current date and hour is Jul. 1, 2002, 12:00:00, the current date and hour is 4 hours before the date of broadcast, thus not determined within the reference time. The process returns to step S131, to make again a determination process as to whether all the programs scheduled have been searched or not. In the present case, because all the programs have not yet searched, the process proceeds to step S132, to extract the next one program. For example, the program designated at number 2 in FIG. 22 is extracted. At step S133, the broadcast date and hour at number 2 is read out as Jul. 1, 2002, 17:30:00.

At step S134, it is determined whether the broadcast date and hour is within the reference time from the present date and hour or not. If not within the reference time, the process returns to step S131, to repetitively execute the subsequent process.

For example, in the case that the program at number 1 is selected wherein the current date and hour is Jul. 1, 2002, 15:59:30, the broadcast date and hour of Jul. 1, 2002, 16:00:00 is within 30 seconds from the current date and hour of Jul. 1, 2002, 15:59:30 (determined within the reference time). Thus, at step S134, the broadcast date and hour is determined within the reference time from the current date and hour. In this case, the process proceeds to step S135 where the picture-recording schedule managing section 67 controls the picture-recording control section 63, to receive the program now being concerned. In the present case, the tuner 31 is caused to receive a broadcast wave of the broadcast station TV Japan.

At step S136, the picture-recording schedule managing section 67 controls the picture-recording control section 63, to store the program received by the process of step S135 to the auxiliary storage device 40.

Namely, the video and audio signal received at this time by the tuner 31 is provided to the encoder 32 and encoded under the MPEG scheme, thereafter being provided and stored to the auxiliary storage device 40.

At step S137, the picture-recording schedule managing section 67 determines whether the program is over or not, by comparing between the broadcast end time of the program now under picture-recording processing and the current date and hour. In the case that the program is not over, the process waits until it is over. In the case the program is over, the process proceeds to step S138 where the picture-recording schedule managing section 67 controls the picture-recording control section 63, to terminate the picture-recording process to the auxiliary storage device 40. Meanwhile, at step S139, the picture-recording schedule managing section 67 controls the picture-recording control section 63, to terminate the reception process of the program by the tuner 31.

At step S140, the picture-recording schedule managing section 67 causes to delete the programs now completed in picture-recording from the picture-recording schedule list.

At step S131, in the case determined that all the programs scheduled have been searched, the process of steps S132 to step S140 is skipped over, ending the process.

The above process is carried out at a constant time interval. The programs recorded in the picture-recording schedule list are automatically recorded, sequentially, to the auxiliary storage device 40.

Incidentally, the picture-recording schedule list shown in FIG. 22 can be sorted into arrangement in the order of broadcast date and hour. If doing so, the program first extracted in the process of step S132 possesses the earliest broadcast date and hour in time. In case its broadcast date and time is determined not within the reference time from the current date and hour, the remaining programs all have broadcast date and hour not fallen within the reference time from the current date and hour, making it possible to omit the determination process concerning those programs.

In case the programs are picture-recorded in the auxiliary storage device 40 as in the above, the picture-recording title managing section 65 registers and manages the information, such as titles and broadcast date and hour, of the picture-recorded programs.

In case the user instructs to reproduce the picture-recoded program through viewing-control application 68, the viewing-control application 68 makes reference to the management information of the picture-recording title managing section 65 and reads out a program title recorded in the auxiliary storage device 40, making it display on the display unit 12. When the user views this display and selects a program as a subject of reproduction, the viewing-control application 68 instructs the picture-recording title reproducing section 62 to reproduce that program. The picture-recording title reproducing section 62 reproduces the instructed program from the auxiliary storage device 40. The video and audio data reproduced from the auxiliary storage device 40 is inputted to the decoder 33 and decoded under the MPEG scheme, thereafter outputted to and displayed on the display unit 12.

By the above process, the user apparatus 3 acquires picture-recording schedule information through the server 2-1, and causes the auto picture-recording schedule control section 71 to implement a picture-recording process. Meanwhile, it acquires the picture-recording schedule information prepared by the registered user, and causes the auto picture-recording schedule control section 71 to implement a picture-recording process. Then, the auto picture-recording schedule control section 71 causes the picture-recording schedule managing section 67 to prepare a picture-recording schedule list (FIG. 22) and carry out a picture-recording process. This allows the picture-recording schedule information to be exchanged between terminals (user apparatuses 3-1, 3-2). Picture-recording a program can be scheduled easily and promptly without imposing burden on the user.

Also, a program can be scheduled for picture-recording easily and promptly without imposing heavy burden on the user at another user apparatus (user apparatus registered).

In the above, although broadcast program information was received from a broadcast station through a broadcast wave, reception is possible from the server 2-2 through the network 1. Meanwhile, although it was picture-recording schedule information that was registered in the server 2-1 and sent to the user apparatus 3, this is not limited to, e.g. actually recorded program information is applicable instead of scheduling. In brief, any piece of information is usable provided that it is picture-recording program information capable of specifying a program as a subject of recording.

The foregoing one series of processes, although can be executed on hardware, can be carried out over software.

In the case of executing the series of processes on software, the program configuring that software is installed from the network or recording medium onto a computer incorporated in exclusive hardware or, for example, general-purpose personal computer capable of executing various functions by being installed with various programs.

The recording medium, as shown in FIG. 4, is configured not only by a removable media 231 constituted by a program-recorded magnetic disk (including floppy disk), optical disk (including CD-ROM (Compact Disk-Read Only Memory), DVD (Digital Versatile Disk)), magnetooptical disk (including MD (Mini-Disk)) or semiconductor memory distributed for providing a program to the user separately from the apparatus main body, but also by a ROM 222 recording a program or a hard disk included in the storage section 228 provided in a state previously incorporated in the apparatus main body to the user.

Incidentally, in the present specification, the step describing a program recorded to the recording medium includes, of course a process to be chronologically made along a described order, also a process to be executed in parallel or discretely even if not necessarily to be processed chronologically.

Meanwhile, in the present specification, system represents the apparatus overall constituted by a plurality of apparatuses.

INDUSTRIAL APPLICABILITY

According to a first invention, picture-recording a program can be scheduled. Particularly, this invention can realize a system for exchanging picture-recording program information between terminal units.

According to a second invention, the user on another information processing apparatus can be allowed to schedule a program. Particularly, the user can be allowed to schedule for picture-recording a program rapidly and easily without imposing heavy burden.

According to a third invention, picture-recording a program by scheduling is possible without generating picture-recording program information.

According to a forth invention, picture-recording program information can be exchanged between a first other information processing apparatus and a second other information processing apparatus. Due to this, profit can be earned as necessary.

The invention claimed is:

1. An information processing system configured by a first information processing apparatus, a second information processing apparatus for exchanging information with said first information processing apparatus and a third information processing apparatus for controlling to exchange information between said first information processing apparatus and said second information processing apparatus, that are connected to a network, said information processing system characterized in that:

said first information processing apparatus
sends a destination of provision, where picture-recording program information is to be provided, to said third information processing apparatus through said network, together with said picture-recording program information about a to-be-picture-recorded program;
said third information processing apparatus
registering said picture-recording program information sent from said first information processing apparatus through said network, and
sending said picture-recording program information registered to said second information processing apparatus through said network in the case said second information processing apparatus is said destination of provision;
said second information processing apparatus receiving said picture-recording program information stored in said third information processing apparatus by said first information processing apparatus, from said third information processing apparatus through said network;
whereby the destination of provision information comprises a user identification identifying the second information processing apparatus, the picture-recording program information is provided from a user of the first information processing apparatus to the third information processing apparatus, and the third information processing apparatus is operable to provide the picture-recording program information to the second information processing apparatus as identified by the user identification,
the user identification being provided in response to an input of information about another user at the first information processing apparatus such that the user of the first information processing apparatus provides to the third information processing apparatus information about the another user identifying the second information processing apparatus.

2. An information processing method for an information processing system configured by a first information processing apparatus, a second information processing apparatus for exchanging information with said first information processing apparatus and a third information processing apparatus for controlling to exchange information between said first information processing apparatus and said second information processing apparatus, that are connected to a network, said information processing method characterized in that:

said first information processing apparatus
sends a destination of provision, where picture-recording program information is to be provided, to said third information processing apparatus through said network, together with said picture-recording program information about a to-be-picture-recorded program;
said third information processing apparatus
registering said picture-recording program information sent from said first information processing apparatus through said network, and
sending said picture-recording program information registered to said second information processing apparatus through said network in the case said second information processing apparatus is said destination of provision;
said second information processing apparatus receiving said picture-recording program information stored in said third information processing apparatus by said first information processing apparatus, from said third information processing apparatus through said network;
whereby the destination of provision information comprises a user identification identifying the second information processing apparatus, the picture-recording program information is provided from a user of the first information processing apparatus to the third information processing apparatus, and the third information processing apparatus is operable to provide the picture-recording program information to the second information processing apparatus as identified by the user identification,
the user identification being provided in response to an input of information about another user at the first information processing apparatus such that the user of the first information processing apparatus provides to the third information processing apparatus information about the another user identifying the second information processing apparatus.

3. An information processing apparatus comprising:
first acquiring means for acquiring picture-recording program information about a to-be-recorded program;
second acquiring means for acquiring destination-of-provision information for specifying a destination of provision where said picture-recording program information is to be provided; and
providing means for providing said picture-recording program information acquired by said first acquiring means to another information processing apparatus;
whereby the destination of provision information comprises a user identification identifying the other information processing apparatus, the picture-recording program information is provided to the information processing apparatus from a user of a third information processing apparatus, and the information processing apparatus is operable to provide the picture-recording program information to the other information processing apparatus as identified by the user identification, the user identification being provided in response to an input of information about another user at the third information processing apparatus such that the user of the third information processing apparatus provides to the information processing apparatus information about the another user identifying the other information processing apparatus.

4. The information processing apparatus according to claim 3, wherein said providing means sends and registers said picture-recording program information and said destination-of-provision information to first another information processing apparatus of said other information processing apparatuses through a network, and further causes said first other information processing apparatus to provide said picture-recording program information to second another information processing apparatus of said other information processing apparatuses defined by said destination-of-provision information through said network.

5. An information processing method for an information processing apparatus, said information processing method comprising:

a first acquiring step of acquiring picture-recording program information about a to-be-recorded program;

a second acquiring step of acquiring destination-of-provision information for specifying a destination of provision where said picture-recording program information is to be provided; and a providing step of providing said picture-recording program information acquired by a process of said first acquiring step to another information processing apparatus;

whereby the destination of provision information comprises a user identification identifying the other information processing apparatus, the picture-recording program information is provided to the information processing apparatus from a user of a third information processing apparatus, and the information processing apparatus is operable to provide the picture-recording program information to the other information processing apparatus as identified by the user identification, the user identification being provided in response to an input of information about another user at the third information processing apparatus such that the user of the third information processing apparatus provides to the information processing apparatus information about the another user identifying the other information processing apparatus.

6. A computer-readable non-transitory medium storing a computer-readable program for implementing an information processing method on an information processing apparatus, the method comprising:

a first acquiring step of acquiring picture-recording program information about a to-be-recorded program;

a second acquiring step of acquiring destination-of-provision information for specifying a destination of provision where said picture-recording program information is to be provided; and a providing step of providing said picture-recording program information acquired by a process of the first acquiring step to another information processing apparatus;

whereby the destination of provision information comprises a user identification identifying the other information processing apparatus, the picture-recording program information is provided to the information processing apparatus from a user of a third information processing apparatus, and the information processing apparatus is operable to provide the picture-recording program information to the other information processing apparatus as identified by the user identification, the user identification being provided in response to an input of information about another user at the third information processing apparatus such that the user of the third information processing apparatus provides to the information processing apparatus information about the another user identifying the other information processing apparatus.

7. A computer-readable non-transitory medium storing a computer-readable program for implementing an information processing method on an information processing apparatus, the method comprising:

a first acquiring step of acquiring picture-recording program information about a to-be-recorded program;

a second acquiring step of acquiring destination-of-provision information for specifying a destination of provision where said picture-recording program information is to be provided; and a providing step of providing the picture-recording program information acquired by a process of the first acquiring step to another information processing apparatus;

whereby the destination of provision information comprises a user identification identifying the other information processing apparatus, the picture-recording program information is provided to the information processing apparatus from a user of a third information processing apparatus, and the information processing apparatus is operable to provide the picture-recording program information to the other information processing apparatus as identified by the user identification, the user identification being provided in response to an input of information about another user at the third information processing apparatus such that the user of the third information processing apparatus provides to the information processing apparatus information about the another user identifying the other information processing apparatus.

8. An information processing apparatus comprising:

access means for accessing another information processing apparatus through a network;

receiving means for receiving picture-recording program information about a to-be-recorded program from said accessed other information processing apparatus through said network, wherein when said other information processing apparatus stores destination of provision information comprising a user identification identifying the information processing apparatus, said receiving means receives first picture-recording program information registered in said other information processing apparatus by a user other than a user on said information processing apparatus and second picture-recording program information provided by said other information processing apparatus by itself;

storing means for storing said picture-recording program information received from said other information processing apparatus;

schedule picture-recording means for picture-recording said program by scheduling, on the basis of said picture-recording program information stored in said storing means;

first acquiring means for acquiring selection information for selecting any one of said first picture-recording program information and said second picture-recording program information,
presenting means for presenting any one of said first picture-recording program information and said second picture-recording program information on the basis of said selection information acquired by said first acquiring means,
second acquiring means for acquiring designation information for designating any one of said first picture-recording program information and said second picture-recording program information presented by said presenting means, and
third acquiring means for acquiring designation information for designating a predetermined program, from said picture-recording program information corresponding to designation information acquired by said second acquiring means,
the user identification being provided to the other information processing apparatus from a third information processing apparatus, and
the user identification being provided in response to an input of information about another user at the third information processing apparatus such that the user of the third information processing apparatus provides to the other information processing apparatus information about the another user identifying the information processing apparatus.

9. The information processing apparatus according to claim 8, further comprising
sending means for sending said designation information acquired by said third acquiring means, to said other information processing apparatus through said network;
whereby said receiving means receives said picture-recording program information of said program sent from said other information processing apparatus through said network and corresponding to said designation information sent by said sending means;
said storing means for storing said picture-recording program information of said program sent by said sending means and corresponding to said designation information.

10. An information processing method for an information processing apparatus, the information processing method comprising:
an access step of accessing another information processing apparatus through a network;
a receiving step of receiving picture-recording program information about a to-be-recorded program from said accessed other information processing apparatus through said network;
a storing step of storing said picture-recording program information received from said other information processing apparatus; and
a schedule picture-recording step of picture-recording the program by scheduling, on the basis of said picture-recording program information stored by a process of said storing step;
whereby the picture-recording program information and destination provision information are provided to the other information processing apparatus from a user of a third information apparatus, the destination of provision information comprising a user identification identifying the information processing apparatus, and the other information processing apparatus is operable to provide the picture-recording program information to the information processing apparatus as identified by the user identification,
the user identification being provided in response to an input of information about another user at the third information processing apparatus such that the user of the third information processing apparatus provides to the other information processing apparatus information about the another user identifying the information processing apparatus.

11. A computer-readable non-transitory medium storing a computer-readable program for implementing an information processing method on an information processing apparatus, the method comprising:
an access step of accessing another information processing apparatus through a network;
a receiving step of receiving picture-recording program information about a to-be-recorded program from said accessed other information processing apparatus through said network;
a storing step of storing said picture-recording program information received from said other information processing apparatus; and
a schedule picture-recording step of picture-recording said program by scheduling, on the basis of said picture-recording program information stored by a process of said storing step;
whereby the picture-recording program information and destination provision information are provided to the other information processing apparatus from a user of a third information apparatus, the destination of provision information comprising a user identification identifying the information processing apparatus, and the other information processing apparatus is operable to provide the picture-recording program information to the information processing apparatus as defined by the user identification,
the user identification being provided in response to an input of information about another user at the third information processing apparatus such that the user of the third information processing apparatus provides to the other information processing apparatus information about the another user identifying the information processing apparatus.

12. A computer-readable non-transitory medium storing a computer-readable program for implementing an information processing method on an information processing apparatus, the method comprising:
an access step of accessing another information processing apparatus through a network;
a receiving step of receiving picture-recording program information about a to-be-recorded program from said accessed other information processing apparatus through said network;
a storing step of storing said picture-recording program information received from said other information processing apparatus; and
a schedule picture-recording step of picture-recording said program by scheduling, on the basis of said picture-recording program information stored by a process of the storing step;
whereby the picture-recording program information and destination provision information are provided to the other information processing apparatus from a user of a third information apparatus, the destination of provision information comprising a user identification identifying the information processing apparatus, and the other information processing apparatus is operable to provide the picture-recording program information to the information processing apparatus as identified by the user identification, the user identification being provided in response to an input of information about another user at the third information processing apparatus such that the user of the third information processing apparatus provides to the other information processing apparatus information about the another user identifying the information processing apparatus.

13. An information processing apparatus connected to a network together with first another information processing apparatus and second another information processing apparatus for exchanging information with said first other information processing apparatus, and for controlling to exchange information between said first other information processing apparatus and said second other information processing apparatus, said information processing apparatus comprising:

first accepting means that said first other information processing apparatus accepts an access through said network;

receiving means for receiving picture-recording program information about a to-be-recorded program and destination-of-provision information specifying a destination of provision where said picture-recording program information is to be provided, sent from said first other information processing apparatus whose access has been accepted by said first receiving means;

registering means for registering said picture-recording program information and destination-of-provision information received by said receiving means;

second receiving means for receiving an access through said network by said second other information processing apparatus;

determining means for determining whether or not said second other information processing apparatus whose access has been accepted by said second accepting means is said destination of provision where said picture-recording program information is to be provided; and first sending means for sending said picture-recording program information registered in said registering means to said second information processing apparatus through said network in a case determined by said determining means that said second other information processing apparatus whose access has been accepted by said second accepting means is said destination of provision where said picture-recording program information is to be provided;

whereby the destination of provision information comprises a user identification identifying the second other information processing apparatus, the picture-recording program information is provided from a user of the first other information processing apparatus to the information processing apparatus, and the information processing apparatus is operable to provide the picture-recording program information to the second other information processing apparatus as identified by the user identification, the user identification being provided in response to an input of information about another user at the first other information processing apparatus such that the user of the first other information processing apparatus provides to the information processing apparatus information about the another user identifying the second other information processing apparatus.

14. The information processing apparatus according to claim 13, further comprising first acquiring means for acquiring designation information for designating said program selected based on said picture-recording program information sent by said first sending means from said second other information processing apparatus through said network, and second sending means for sending said picture-recording program information of said program corresponding to said designation information acquired by said first acquiring means to said second information processing apparatus through said network.

15. The information processing apparatus according to claim 14, wherein said first sending means sends, to said second other information processing apparatus, first picture-recording program information registered by said first other information processing apparatus and selection information for selecting second picture-recording program information provided by said information processing apparatus by itself, said acquiring means acquiring said designation information for designating said program selected based on said picture-recording program information as a selected one by said first other information processing apparatus of any one of said first picture-recording program information and second picture-recording program information sent by said first sending means.

16. An information processing method for an information processing apparatus connected to a network together with first another information processing apparatus and second another information processing apparatus for exchanging information with said first other information processing apparatus, and for controlling to exchange information between said first other information processing apparatus and said second other information processing apparatus, said information processing method comprising:

a first accepting step of accepting an access through said network by said first other information processing apparatus;

a receiving step of receiving picture-recording program information about a to-be-recorded program and destination-of-provision information for specifying a destination of provision where said picture-recording program information is to be provided, sent from said first other information processing apparatus whose access has been accepted by a process of said first accepting step;

a registering step of registering said picture-recording program information and destination-of-provision information received by a process of said receiving step;

a second accepting step for accepting an access by said second other information processing apparatus through said network;

a determining step of determining whether or not said second other information processing apparatus whose access has been accepted by a process of said second accepting step is said destination of provision where said picture-recording program information is to be provided; and a sending step of sending said picture-recording program information registered by a process of said registering step to said second information processing apparatus through said network in a case determined by a process of said determining step that said second other information processing apparatus whose access has been accepted by a process of said second accepting step is said destination of provision where said picture-recording program information is to be provided;

whereby the destination of provision information comprises a user identification identifying the second other information processing apparatus, the picture-recording program information is provided from a user of the first other information processing apparatus to the information processing apparatus, and the information processing apparatus is operable to provide the picture-recording program information to the second other information processing apparatus as identified by the user identification, the user identification being provided in response to an input of information about another user at the first other information processing apparatus such that the user of the first other information processing apparatus provides to the information processing apparatus information about the another user identifying the second other information processing apparatus.

17. A computer-readable non-transitory medium storing a computer-readable program for implementing an information processing method on an information processing apparatus connected to a network together with first another information processing apparatus and second another information processing apparatus for exchanging information with said first other information processing apparatus, the method comprising:

a first accepting step of accepting an access through said network by said first other information processing apparatus;

a receiving step of receiving picture-recording program information about a to-be-recorded program and destination-of-provision information for specifying a destination of provision where said picture-recording program information is to be provided, sent from said first other information processing apparatus whose access has been accepted by a process of said first accepting step;

a registering step of registering said picture-recording program information and destination-of-provision information received by a process of said receiving step;

a second accepting step for accepting an access through said network by said second other information processing apparatus;

a determining step of determining whether or not said second other information processing apparatus whose access has been accepted by a process of said second accepting step is said destination of provision where said picture-recording program information is to be provided; and a sending step of sending said picture-recording program information registered by a process of said registering step to said second information processing apparatus through said network in a case determined by a process of said determining step that said second other information processing apparatus whose access has been accepted by a process of said second accepting step is said destination of provision where said picture-recording program information is to be provided;

whereby the destination of provision information comprises a user identification identifying the second other information processing apparatus, the picture-recording program information is provided from a user of the first other information processing apparatus to the information processing apparatus, and the information processing apparatus is operable to provide the picture-recording program information to the second other information processing apparatus as identified by the user identification, the user identification being provided in response to an input of information about another user at the first other information processing apparatus such that the user of the first other information processing apparatus provides to the information processing apparatus information about the another user identifying the second other information processing apparatus.

18. A computer-readable non-transitory medium storing a computer-readable program for implementing an information processing method on an information processing apparatus connected to a network together with first another information processing apparatus and second another information processing apparatus for exchanging information with said first other information processing apparatus, the method comprising:

a first accepting step of accepting an access through said network by said first other information processing apparatus;

a receiving step of receiving picture-recording program information about a to-be-recorded program and destination-of-provision information for specifying a destination of provision where said picture-recording program information is to be provided, sent from said first other information processing apparatus whose access has been accepted by a process of said first accepting step;

a registering step of registering the picture-recording program information and destination-of-provision information received by a process of said receiving step;

a second accepting step for accepting an access through the network by said second other information processing apparatus;

a determining step of determining whether or not said second other information processing apparatus whose access has been accepted by a process of said second accepting step is said destination of provision where said picture-recording program information is to be provided; and a sending step of sending said picture-recording program information registered by a process of said registering step to said second information processing apparatus through said network in a case determined by a process of said determining step that said second other information processing apparatus whose access has been accepted by a process of said second accepting step is said destination of provision where said picture-recording program information is to be provided;

whereby the destination of provision information comprises a user identification identifying the second other information processing apparatus, the picture-recording program information is provided from a user of the first other information processing apparatus to the information processing apparatus, and the information processing apparatus is operable to provide the picture-recording program information to the second other information processing apparatus as identified by the user identification, the user identification being provided in response to an input of information about another user at the first other information processing apparatus such that the user of the first other information processing apparatus provides to the information processing apparatus information about the another user identifying the second other information processing apparatus.

* * * * *